US012233396B2

(12) United States Patent
Yuan et al.

(10) Patent No.: US 12,233,396 B2
(45) Date of Patent: Feb. 25, 2025

(54) MOLECULAR SIEVE COMPLEX, COMPOSITE MATERIAL AND APPLICATION THEREOF

(71) Applicants: CHINA PETROLEUM & CHEMICAL CORPORATION, Beijing (CN); SINOPEC QILU COMPANY, Shandong (CN)

(72) Inventors: Huizhi Yuan, Shandong (CN); Aihua Liu, Shandong (CN); Jianli Liu, Shandong (CN); Cuicui Xu, Shandong (CN); Zengrang Liu, Shandong (CN); Weidong Tao, Shandong (CN); Wenzhi Chang, Shandong (CN); Caishan Lyu, Shandong (CN)

(73) Assignees: CHINA PETROLEUM & CHEMICAL CORPORATION, Beijing (CN); SINOPEC QILU COMPANY, Shandong (CN)

( * ) Notice: Subject to any disclaimer, the term of this patent is extended or adjusted under 35 U.S.C. 154(b) by 528 days.

(21) Appl. No.: 17/768,137

(22) PCT Filed: Jul. 24, 2020

(86) PCT No.: PCT/CN2020/104505
§ 371 (c)(1),
(2) Date: Apr. 11, 2022

(87) PCT Pub. No.: WO2021/068600
PCT Pub. Date: Apr. 15, 2021

(65) Prior Publication Data
US 2023/0149891 A1 May 18, 2023

(30) Foreign Application Priority Data

Oct. 11, 2019 (CN) .......................... 201910964556.5

(51) Int. Cl.
*B01J 20/18* (2006.01)
*B01D 53/50* (2006.01)
(Continued)

(52) U.S. Cl.
CPC ............ *B01J 20/18* (2013.01); *B01D 53/508* (2013.01); *B01J 20/28064* (2013.01);
(Continued)

(58) Field of Classification Search
CPC .................. B01J 20/18; B01J 20/28064; B01J 20/28071; B01J 29/061; B01J 29/084;
(Continued)

(56) References Cited

U.S. PATENT DOCUMENTS 5,002,742 A 3/1991 Lussier et al.
2002/0178915 A1 12/2002 Shore et al.

FOREIGN PATENT DOCUMENTS

CA 1075217 A 4/1980
CN 1566270 A 1/2005
(Continued)

OTHER PUBLICATIONS

CN 108246249 A English translation (Year: 2018).*
(Continued)

*Primary Examiner* — Anita Nassiri-Motlagh
(74) *Attorney, Agent, or Firm* — NKL Law; Allen Xue

(57) ABSTRACT

A molecular sieve complex contains an oxide of aluminum, an oxide of an alkaline earth metal and a rare earth-modified molecular sieve. The rare earth-modified molecular sieve is a molecular sieve doped by a rare earth element. The percentage of the pore volume occupied by pores of 3 nm or less to the total pore volume in the molecular sieve complex is greater than or equal to 63.5%. The content of the rare earth element and the contents of the oxide of aluminum, the oxide of the alkaline earth metal and the molecular sieve (Continued)

satisfy a certain relationship. The composite material contains a molecular sieve complex and an auxiliary agent loaded on the molecular sieve complex, and the composite material may be applied to flue gas adsorption and desulfurization.

20 Claims, 4 Drawing Sheets

(51) Int. Cl.
  *B01J 20/28* (2006.01)
  *B01J 29/06* (2006.01)
  *B01J 29/08* (2006.01)
(52) U.S. Cl.
  CPC ....... *B01J 20/28071* (2013.01); *B01J 29/061* (2013.01); *B01J 29/084* (2013.01); *B01D 2253/108* (2013.01); *B01D 2253/306* (2013.01); *B01D 2253/311* (2013.01); *B01D 2257/302* (2013.01); *B01D 2258/0283* (2013.01)
(58) Field of Classification Search
  CPC ............ B01D 53/508; B01D 2253/108; B01D 2257/302; B01D 2258/0283
  USPC .......................................................... 502/79
  See application file for complete search history.

(56) References Cited

FOREIGN PATENT DOCUMENTS

| CN | 1660971 | A | 8/2005 |
|---|---|---|---|
| CN | 1676576 | A | 10/2005 |
| CN | 101176849 | A | 5/2008 |
| CN | 101433817 | A | 5/2009 |
| CN | 101898148 | A | 12/2010 |
| CN | 102380311 | A | 3/2012 |
| CN | 103028368 | A | 4/2013 |
| CN | 103285934 | A | 9/2013 |
| CN | 103801389 | A | 5/2014 |
| CN | 104555940 | A | 4/2015 |
| CN | 104689787 | A | 6/2015 |
| CN | 105344323 | A | 2/2016 |
| CN | 105854577 | A | 8/2016 |
| CN | 105983294 | A | 10/2016 |
| CN | 106238091 | A | 12/2016 |
| CN | 106938188 | A | 7/2017 |
| CN | 108246249 | A | 7/2018 |
| CN | 108452825 | A | 8/2018 |
| CN | 108624357 | A | 10/2018 |
| CN | 109277075 | A | 1/2019 |
| CN | 109439376 | A | 3/2019 |
| CN | 109772270 | A | 5/2019 |
| ES | 2192967 | A1 | 10/2003 |
| GB | 1347877 | A | 2/1974 |
| WO | 2005060519 | A2 | 7/2005 |
| WO | 2012071794 | A1 | 6/2012 |

OTHER PUBLICATIONS

Zhao, Chunfang et al.; "National Standard GB/T 6609.35-2009—Chemical analysis methods and determination of physical performance of alumina—Part35: Determination of specific surface area by nitrogen adsorption"; Aug. 17, 2009; pp. 1-10 XP093080375.
Communication pursuant to Article 94(3) for Application No. 20874727.9; European Patent Office; Sep. 14, 2023; pp. 1-5.
Wu, Xiaodong et al.; "Rare Earth Catalytic Materials"; Chinese Radial Press, Jun. 30, 2017; p. 55.
Zhang, Bo et al.; "Operational Management of Environmental Pollution Remediation Facility"; Chinese Environmental Science Press; Aug. 31, 2006; p. 300.
Bao, Xinhua; "Inorganic Chemistry Experiments"; Shanghai University Press; Sep. 30, 2010; p. 261.
Chinese Patent Office, Second Office Action of priority application CN 201910964556.5, Jan. 28, 2022.

* cited by examiner

US 12,233,396 B2

MOLECULAR SIEVE COMPLEX, COMPOSITE MATERIAL AND APPLICATION THEREOF

FIELD

The present disclosure relates to the technical field of desulfurization, in particular to a molecular sieve complex, a composite material and use thereof.

BACKGROUND $SO_2$ is the primary cause of acid rain; it can destroy the physiological function of plants, and slow down growth of crops and trees; when the human body inhales $SO_2$ gas with a high concentration, which can impose a strong irritating effect on the respiratory tract of human. $SO_2$ is regarded as the major pollutant in the atmosphere and has attracted wide attention of the populace. For example, $SO_2$ emissions have been reported to cause 40% of the domestic land area in China to be harmed by acid rain, the annual economic loss is up to 110 billion yuan. Therefore, controlling pollution and reducing $SO_2$ emissions are important tasks to achieve the sustainable economic and social development of China.

$SO_2$-containing exhaust gas will be generated in the exhaust gas of industrial heating furnaces, sulfur tail gas and catalytic cracking regenerative flue gas. Given that the environmental protection regulations in China are increasingly stringent, the task of reducing $SO_2$ emission is extremely urgent. At present, the flue gas desulfurization technologies at home and abroad are divided into two major categories. The first category is a wet process, i.e., the exhaust gas is treated with some kind of liquid absorbent, emulsion absorbent or absorption solution; the second category is a dry process, i.e., the $SO_2$ in the flue gas is removed by a sorbent, an absorbent or a catalyst in powder or granular form. The most representative and fastest growing technique of the wet process desulfurization technologies is alkaline washing desulfurization, such as the LAB SORB™ technology commercially available from the DuPont™ BELCO Corporation. A lower emission of 50 mg/m³ or less is achieved by the wet process desulfurization technology which subjects the flue gas to the alkaline washing, but the process brings about the new secondary pollutants, namely sodium sulfate-containing waste water, which is forbidden by the law and regulations to be directly discharged and its retreatment process requires a large amount of investment. The China Petroleum & Chemical Corporation (Sinopec) has completely banned the newly implemented the alkaline process desulfurization on the fume gas emitted by a variety of facilities. The dry process desulfurization has been gaining momentum in recent years due to its characteristics of simple operation, small investment on equipment, and not causing secondary pollution, and is regarded as the most promising desulfurization technology with vast application prospect. The research and development of dry process flue gas desulfurization technologies have attracted widespread attention at home and abroad in recent years. If a mature technology of dry process desulfurization can be used for removing sulfur dioxide in the flue gas, it would be desirable to meet requirements of the environmental protection regulations and safeguard the atmospheric environment while reducing the emission amount of $SO_2$.

The core of the dry process desulfurization technology is the adsorbent. The molecular sieves and activated carbons are the key adsorbents used for the dry process adsorption desulfurization. Molecular sieve is a crystal material with uniform pore size, it has selective adsorption characteristics for simultaneously removing $H_2S$ and organic sulfur, which reduces the sulfur content to less than 15 mg/m³ after the desulfurization process, thus it is an excellent sulfide adsorbent. Molecular sieve adsorbent can be repeatedly regenerated under certain conditions and has a long service life. Under the new trend that the environmental protection requirements are increasingly stringent, the desulfurization process with the molecular sieve has a wide-spread application prospect.

CN104689787A discloses a liquefied petroleum gas dechlorination adsorbent and use method thereof, wherein the adsorbent comprises a molecular sieve and metallic oxides with a chlorine adsorption function, wherein the molar ratio of silicon atom to aluminum atom in the molecular sieve is 1-45; the specific surface area of the molecular sieve is 300 to 650 m²/g; the weight ratio of the molecular sieve to the metallic oxides with the chlorine adsorption function is 45-98: 25-50; wherein metallic oxides with the chlorine adsorption function is one or more selected from the group consisting of oxides of Na, K, Mg, Ca, Al, lanthanide, Sc, Ti, V, Cr, Mn, Fe, Co, Ni, Cu, Zn, Mo, W, Ru, Rh, Pd, Ag, Cd, Au and Pt.

CN109277075A discloses an adsorbent for purifying coke oven gas, the adsorbent comprises the following components based on the parts by weight of the adsorbent:

a) 5-95 parts of a reactive element modified hydrophobic molecular sieve adsorbent A;

b) 5-95 parts of a reactive element modified hydrophobic molecular sieve adsorbent B;

wherein the active element is at least one selected from the group consisting of the elements of groups IA, IIA, VA, IB, IIB, IIIB, IVB, VB, VIB, VIIB, or VIII of the periodic Table of the elements; in the hydrophobic molecular sieve adsorbent A, the molecular sieve is at least one selected from the group consisting of an X-type molecular sieve, a Y-type molecular sieve, an A-type molecular sieve, a β-type molecular sieve, a SAPO-type molecular sieve, MCM-22, MCM-49 and MCM-56 molecular sieves; in the hydrophobic molecular sieve adsorbent B, the molecular sieve is at least one selected from the group consisting of a ZSM-type molecular sieve, mordenite, a β-type molecular sieve, ZSM-5/mordenite, ZSM-5/beta zeolite, ZSM-5/Y, MCM-22/mordenite, ZSM-5/Magadiite, ZSM-5/beta zeolite/mordenite, ZSM-5/beta zeolite/Y zeolite, or ZSM-5/Y zeolite/mordenite.

Although the above-mentioned patent documents disclose the technical solution of using the molecular sieves as the adsorbents, the patent documents do not formulate an application of the molecular sieve in the desulfurization, a balance between the desulfurization rate and the sulfur breakthrough capacity can hardly be obtained. Therefore, the development of an adsorbent having high desulfurization rate and sulfur breakthrough capacity based on the molecular sieve has an important significance.

SUMMARY

An object of the present disclosure is to overcome the problem in the prior art that a balance between the desulfurization rate and the sulfur breakthrough capacity can hardly be obtained, and provides a molecular sieve complex, a composite material and a preparation method and use thereof.

The conventional molecular sieve adsorbent has a high content of macro-pores or meso-pores, and has a poor adsorption desulfurization. The inventors of the present disclosure have discovered during the research process that the desulfurization effect can be significantly improved through the introduction of an aluminum binder to control the content of micro-pores in the molecular sieve adsorbents and the introduction of the specific metal oxides according to the specific content relationship, in particular, the molecular sieve complex is prepared by blending and kneading a precursor of alkaline earth metal in the presence of a precursor of aluminum with the rare earth-modified molecular sieves having a specific pore distribution according to the specific ration, and calcinating the mixture, and the adsorbents with excellent desulfurization performance can be prepared by further loading the molecular sieve complex with a specific metal auxiliary agent. Therefore, in order to fulfill the above purpose, an aspect of the present disclosure provides a molecular sieve complex, comprising an oxide of aluminum, an oxide of an alkaline earth metal and a rare earth-modified molecular sieve, wherein the rare earth-modified molecular sieve is a molecular sieve doped by a rare earth element, wherein the percentage of the pore volume occupied by pores of 3 nm or less to the total pore volume in the molecular sieve complex is greater than or equal to 63.5%; and the molecular sieve complex satisfies the following formula I:

$$\frac{W4 + 0.9W1W2}{W1} \leq W3 \leq \frac{W1}{5W2} \quad \text{formula I}$$

in formula I:

$W_1$ represents the weight content of total aluminum in the molecular sieve complex in terms of an oxide of aluminum;

$W_2$ represents the weight content of an oxide of an alkaline earth metal in the molecular sieve complex;

$W_3$ represents the weight content of rare earth element in molecular sieve complex in terms of oxide;

$W_4$ represents the weight content of molecular sieve in the molecular sieve complex in terms of $SiO_2$.

In a second aspect, the present disclosure provides a composite material comprising the aforementioned molecular sieve complex and an auxiliary agent loaded on the molecular sieve complex.

In a third aspect, the present disclosure provides an use of the aforementioned molecular sieve complex or composite material in adsorption desulfurization.

In a fourth aspect, the present disclosure provides a system with a desulfurization function, wherein the system comprises:

an oxidation unit for treating sulfur-containing gas and recovering sulfur;

a hydrogenation purification unit, which is connected with the oxidation unit for subjecting the oxidation tail gas discharged from the oxidation unit to hydrogenation reduction and recovering hydrogen sulfide in the reduced product obtained from the hydrogenation reduction;

an incineration unit for incinerating the purified tail gas discharged from the hydrogenation purification unit;

an adsorption unit for adsorbing $SO_2$ from the $SO_2$-containing flue gas obtained by incineration, wherein the adsorbent used in the adsorption unit is the aforementioned composite material.

In a fifth aspect, the present disclosure provides a method for desulfurization, wherein the method comprises the following steps:

(a) oxidizing the sulfur-containing gas to be treated and recovering the sulfur;

(b) subjecting the oxidized tail gas to hydrogenation reduction and recovering hydrogen sulfide from the reduction product obtained from the hydrogenation reduction;

(c) incinerating the tail gas obtained after the hydrogenation reduction;

(d) contacting the incinerated $SO_2$-containing flue gas with a sorbent to adsorb $SO_2$, the sorbent is the aforementioned composite material.

The advantages of the present disclosure over the prior art are as follows:

(1) The composite material of the present disclosure applied as the adsorbent has a high saturated sulfur capacity and sulfur breakthrough capacity. The composite material has a specific surface area more than 550 $m^2/g$ and a pore volume large than 0.25 ml/g, which ensures that the composite material has desirable adsorbability, and the composite material has a saturated sulfur capacity equal to or greater than 12%, a sulfur capacity (sulfur breakthrough capacity) more than 10% when the removal rate of $SO_2$ is lowered to 99%, and a long total time used for reaching the sulfur breakthrough capacity.

(2) The composite material of the present disclosure has desired regeneration properties and can be used for multiple cycles.

(3) The composite material of the present disclosure has a simple preparation process, and the preparation process does not bring about the secondary pollution.

(4) The composite material of the present disclosure can promote development of the dry process desulfurization techniques, and provide a clean, secondary pollution-free, environmentally friendly process for the treatment of sulfur-containing waste gas.

DESCRIPTION OF REFERENCE SIGNS

Figure 1:
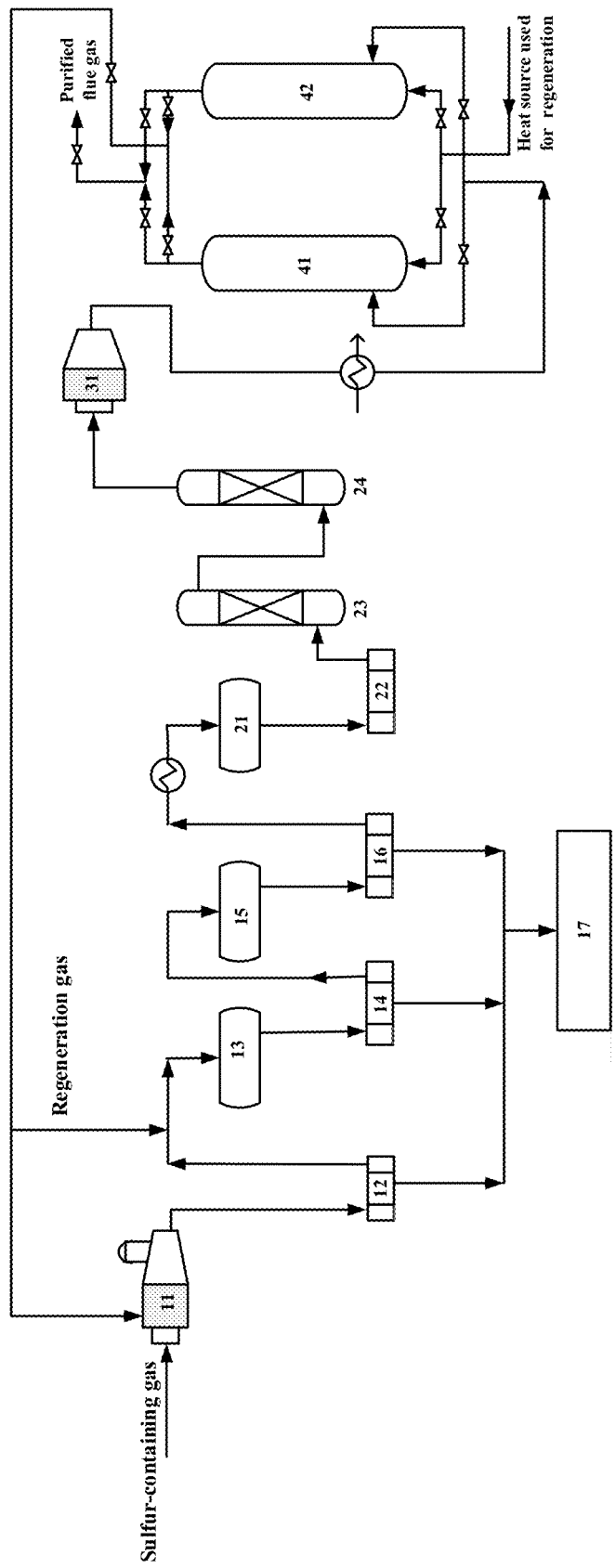
FIG. 1 illustrates a schematic structure diagram of a system according to a preferred embodiment of the present disclosure.

11 Thermal reaction furnace
12 First stage condenser
13 Primary catalytic converter
14 Second stage condenser
15 Secondary catalytic converter
16 Third stage condenser
17 Liquid sulfur pool
21 Hydrogenation reactor
22 Hydrogenation tail gas cooler
23 Quench tower
24 Absorption tower
31 Incineration unit
41 First absorption tower
42 Second absorption tower
111 Tail gas reheater
222 Flue gas heat exchanger

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

Unless otherwise specified in the present disclosure, the volume of gas is expressed with the volume under the standard temperature and pressure (STP, i.e., under the temperature of 0° C. or 273K and a pressure of $1.01 \times 10^5$ Pa); the term "silicon-aluminum ratio" means the molar ratio between the silicon element and the aluminum element; the term "ppm or parts per million" is the unit of volume concentration; the pressure refers to the gauge pressure. The term "saturated sulfur capacity" means the maximum amount of sulfur that can be absorbed per unit weight of the desulfurizing agent, that is, the fresh adsorbent is continuously contacted with the sulfur-containing gas, the saturated sulfur capacity is exactly the weight percentage of the sulfur content adsorbed by the adsorbent relative to the adsorbent when the sulfur content of the sulfur-containing gas before the contact with the adsorbent is equal to the sulfur content of the sulfur-containing gas after the contact with the adsorbent. The term "sulfur breakthrough capacity" refers to the weight percentage of sulfur that can be absorbed by the adsorbent when the process purge degree index (removal rate is reduced to 99%) is ensured under the conditions consisting of a gas volume hourly space velocity of 1,750 $h^{-1}$ and a reaction temperature of 120° C.

The present disclosure provides a molecular sieve complex, comprising an oxide of aluminum, an oxide of an alkaline earth metal and a rare earth-modified molecular sieve, wherein the rare earth-modified molecular sieve is a molecular sieve doped by a rare earth element, wherein the percentage of the pore volume occupied by pores of 3 nm or less to the total pore volume in the molecular sieve complex is greater than or equal to 63.5%; and the molecular sieve complex satisfies the following formula I:

$$\frac{W4 + 0.9W1W2}{W1} \le W3 \le \frac{W1}{5W2} \qquad \text{formula I}$$

in formula I:

$W_1$ represents the weight content of total aluminum in the molecular sieve complex in terms of an oxide of aluminum;

$W_2$ represents the weight content of an oxide of an alkaline earth metal in the molecular sieve complex;

$W_3$ represents the weight content of rare earth element in molecular sieve complex in terms of oxide;

$W_4$ represents the weight content of molecular sieve in the molecular sieve complex in terms of $SiO_2$.

In the present disclosure, the total aluminum refers to the sum of aluminum elements provided by an oxide of aluminum and the rare earth-modified molecular sieve, the content is calculated based on $Al_2O_3$; the content of an oxide of the alkaline earth metal is measured in terms of an oxide of the divalent metal; among the rare earth elements, the content of cerium is measured in terms of $CeO_2$, and the content of rare earth elements other than cerium is measured based on the oxides of the trivalent metals.

The molecular sieve complex according to the present disclosure, wherein the percentage of the pore volume occupied by pores below 3 nm to the total pore volume in the molecular sieve complex is within a range of 63.5-72%.

More preferably, the percentage of the pore volume occupied by pores below 2 nm to the total pore volume in the molecular sieve complex is greater than or equal to 35%, further preferably within a range of 39-45.5%.

More preferably, the percentage of the pore volume occupied by pores of 2-3 nm to the total pore volume in the molecular sieve complex is within a range of 20-30%.

More preferably, the percentage of the pore volume occupied by pores larger than 3 nm to the total pore volume in the molecular sieve complex is within a range of 25-40%.

The molecular sieve complex having the pore size distributed within the preferred ranges described above can achieve the adsorbent materials with more desirable desulfurization properties.

For the molecular sieve complex according to the present disclosure, the weight ratio between the oxide of aluminum and the molecular sieve is preferably (8-35):100, more preferably (12-28):100, such as 12:100, 15:100, 18:100, 19:100, 20:100, 25:100, 26:100, 27:100, 28:100, or any value between the above-mentioned numerical values. Wherein the weight percentage of molecular sieve in the molecular sieve complex or the composite material may be calculated and characterized by the relative crystallinity of the molecular sieve complex or the composite material. The relative crystallinity is measured by the X-Ray Diffraction (XRD) method, the apparatus is a Rigaku Dmax-2500 X-ray diffractometer, the Cuk$\alpha$ radiation is used, graphite single crystal is used for filtering, the operation tube voltage is 35 KV, the tube current is 40 mA, the scanning speed (2θ) is 2°/min, the scan range is 4°-35°; the standard sample is NaY molecular sieve, which has a Si/Al ratio of 5, a specific surface area of 850 $m^2/g$, a pore volume of 0.32 ml/g, the percentage of the pore volume occupied by pores below 2 nm to the total pore volume in the molecular sieve is 32:7%, the percentage of the pore volume occupied by pores of 2-3 nm to the total pore volume in the molecular sieve is 22.8%, the percentage of the pore volume occupied by pores larger than 3 nm to the total pore volume in the molecular sieve is 44.5%.

According to the molecular sieve complex of the present disclosure, the weight ratio between the oxide of an alkaline earth metal and the molecular sieve is preferably (0.5-3):100, more preferably (0.6-2.1):100, such as 0.6:100, 1:100, 1.1:100, 1.2:100, 1.3:100, 1.8:100, 1.9:100, 2:100, 2.1:100, or any value between the above-mentioned numerical values.

The molecular sieve complex according to the present disclosure, a weight ratio between said rare earth elements and the molecular sieve is preferably (2.5-10):100, more preferably (3.7-9.3):100, such as 3.7:100, 4:100, 5:100, 5.1:100, 5.4:100, 5.5:100, 6:100, 6.4:100, 6.5:100, 6.9:100, 7.5:100, 7.9:100, 8:100, 9.2:100, 9.3:100, or any value between the above-mentioned numerical values.

According to the present disclosure, the oxide of aluminum may be the common oxide of aluminum with different valence states, particularly the oxide obtained after subjecting the conventional aluminum precursor to a high temperature calcinating. Preferably, the oxide of aluminum is $Al_2O_3$.

In accordance with the present disclosure, the oxide of alkaline earth metal may be an oxide of conventional alkaline earth metal with different valence states, such as beryllium (Be), magnesium (Mg), calcium (Ca), strontium (Sr), barium (Ba) and radium (Ra), in particular an oxide obtained by subjecting a precursor of the conventional alkaline earth metal to a high temperature calcinating. Preferably, the oxide of alkaline earth metal is at least one of CaO, MgO and BaO.

According to the present disclosure, the rare earth element may be a common rare earth element, such as lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), yttrium (Y) and scandium (Sc). Preferably, the rare earth element is Ce and/or La. Further preferably, the rare earth elements are Ce and La, and the weight ratio of Ce to La is within a range of 1-3. Selection of the preferred oxide of the rare earth element can further improve the adsorption properties of a composite material prepared based on the molecular sieve complex.

According to the present disclosure, the rare earth-modified molecular sieve may be a conventional rare earth-modified molecular sieve, in particular a rare earth-modified Y-type molecular sieve, preferably a rare earth-modified NaY molecular sieve. In the rare earth-modified molecular sieve, the rare earth elements are bonded to the pores of molecular sieve in the form of cations.

According to a preferred embodiment of the present disclosure, the specific surface area of the molecular sieve complex is greater than or equal to 550 $m^2/g$, more preferably within a range of 550-600 $m^2/g$.

According to a preferred embodiment of the present disclosure, the molecular sieve complex has a pore volume greater than or equal to 0.25 ml/g, more preferably within a range of 0.25-0.4 ml/g. The present disclosure provides a method for preparing a molecular sieve complex, wherein the method comprises the following steps: blending and kneading, molding, drying, and calcinating an aluminum precursor, an alkaline earth metal precursor, a rare earth-modified molecular sieve, and optionally a non-metallic binder in the presence of a solvent, wherein the rare earth-modified molecular sieve is a molecular sieve doped with a rare earth element; the aluminum precursor, the alkaline earth metal precursor, and the rare earth-modified molecular sieve are used in an amount such that the contents of the aluminum element, the alkaline earth metal element, the rare earth element and the molecular sieve in the produced molecular sieve complex satisfies formula I, wherein the weights of the aluminum element, the alkaline earth metal element and the rare earth element are based on the corresponding oxide.

In the method for preparing a molecular sieve complex according to the present disclosure, the aluminum precursor and the rare earth-modified molecular sieve are used in an amount such that the weight ratio between the aluminum element and the molecular sieve in the produced molecular sieve complex is preferably (8-35):100, more preferably (12-28):100.

According to the method for preparing a molecular sieve complex of the present disclosure, the precursor of the alkaline earth metal and the rare earth-modified molecular sieve are used in an amount such that the weight ratio between the alkaline earth metal element and the molecular sieve in the molecular sieve complex is preferably (0.5-3):100, more preferably (0.6-2.1):100.

According to the method for preparing a molecular sieve complex of the present disclosure, the rare earth element is used in an amount such that the weight ratio between the rare earth element and the molecular sieve in the molecular sieve complex is preferably (2.5-10):100, more preferably (3.7-9.3):100.

The present disclosure does not impose specific limitation on the precursor of aluminum, but preferably, the precursor of aluminum is an oxide of aluminum and/or a hydroxide of aluminum, more preferably aluminum hydroxide and/or pseudo-boehmite.

According to the present disclosure, there is no particular requirement for the precursor of the alkaline earth metal, the precursor of the alkaline earth metal is preferably at least one selected from the group consisting of an oxide of the alkaline earth metal, a hydroxide of the alkaline earth metal, a carbonate of the alkaline earth metal and a nitrate of the alkaline earth metal, more preferably at least one selected from the group consisting of calcium oxide, calcium carbonate, calcium nitrate, magnesium oxide, magnesium carbonate, magnesium nitrate, barium oxide and barium carbonate.

According to the present disclosure, the rare earth element may be a common rare earth element, such as lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), yttrium (Y), and scandium (Sc). Preferably, the rare earth element is Ce and/or La. Further preferably, the rare earth elements are Ce and La, and the weight ratio of Ce to La is 1-3. Selection of the preferred oxide of the rare earth element can further improve the adsorption properties of the finally prepared composite material.

According to the present disclosure, the rare earth-modified molecular sieve may be a conventional rare earth-modified molecular sieve, in particular a rare earth-modified Y-type molecular sieve, preferably a rare earth-modified NaY molecular sieve. In the rare earth-modified molecular sieve, the rare earth elements are bonded to the pores of molecular sieve in the form of cations.

According to the present disclosure, the non-metallic binder is an optionally used substance, an use of the non-metallic binder facilitates the formation of the molecular sieve complex. The present disclosure does not impose specific limitation on dosage of the non-metallic binder, but the weight ratio of the molecular sieve to the non-metallic binder is preferably 100:(1-3).

According to the present disclosure, the non-metallic binder may be a variety of existing binders which do not contain metallic elements, the non-metallic binder is preferably an organic acid and/or an inorganic acid, further preferably at least one selected from the group consisting of nitric acid, hydrochloric acid, sulfuric acid and citric acid.

According to the present disclosure, the rare earth-modified molecular sieve may be obtained through a conventional mode, for example, the method of preparing the rare earth-modified molecular sieve comprises: mixing (performing ion exchange) a molecular sieve with a water-soluble salt of a rare earth metal under the condition of a pH=3 to 5. Preferably, the molecular sieve has a Si/Al ratio of 2-10, more preferably 4.5-7. Preferably, the molecular sieve has a specific surface area greater than or equal to 600 $m^2/g$, more preferably within a range of 700-1,000 $m^2/g$. Preferably, the molecular sieve has a pore volume greater than or equal to 0.3 ml/g, more preferably within a range of 0.3-0.35 ml/g. More preferably, the molecular sieve is a NaY molecular sieve. In the molecular sieve, the percentage of the pore volume occupied by pores below 2 nm to the total pore volume is within a range of 20-35%, the percentage of the pore volume occupied by pores of 2-3 nm to the total pore volume is within a range of 10-26%, the percentage of the pore volume occupied by pores larger than 3 nm to the total pore volume in the molecular sieve complex is within a range of 40-65%. The water-soluble salt of the rare earth metal may be various substances that are soluble in water to produce the rare earth metal ions, preferably the water-soluble salt of the rare earth metal is a nitrate of the rare earth metal and/or a chloride of the rare earth metal, more preferably at least one of cerium nitrate, cerium chloride, lanthanum nitrate and lanthanum chloride. The mixing conditions are not particularly limited in the present disclosure, but it is preferable that the mixing conditions comprise a temperature of 70-90° C. Preferably, the mixing conditions further comprise a time period of 20 min to 3 h. In order to increase the content of the rare earth element (i.e., enhance the exchange depth of the rare earth ion) in the rare earth-modified molecular sieve, the method may further comprise drying and calcinating (at the temperature 500-600° C. for 3-6 h) the mixed product, and further blending (performing secondary exchange) the molecular sieve with the water-soluble salt of the rare earth metal under the condition comprising a pH=3 to 5.

According to the method of preparing the molecular sieve complex of the present disclosure, the conditions for drying may comprise a drying temperature of 100-160° C., preferably 110-130° C. The conditions for drying may further comprise a drying time of 4-6 h.

In accordance with the method of preparing a molecular sieve complex of the present disclosure, the conditions of calcinating may comprise a calcinating temperature within a range of 400-700° C., preferably within a range of 450-600° C. The conditions of calcinating may further comprise a calcinating time within a range of 3-8 h, preferably within the range of 4-6 h.

The method for preparing a molecular sieve complex according to the present disclosure does not impose special requirement on the solvent, which may be a common organic solvent and/or an inorganic solvent. However, it is preferable that the solvent is water. Those skilled in the art may control the dosage of the solvent according to the requirements of blending, kneading and molding, the relevant content will not be further described herein.

According to the method of preparing molecular sieve complex of the present disclosure, the blending, kneading and molding may be performed in a conventional manner, for example, by means of a molding apparatus, such as a strip extruder.

The present disclosure also provides a molecular sieve complex prepared with the aforementioned method.

The present disclosure provides a composite material, wherein the composite material comprises the aforementioned molecular sieve complex and an auxiliary agent loaded on the molecular sieve complex.

According to the composite material of the present disclosure, the percentage of the pore volume occupied by pores below 3 nm to the total pore volume in the composite material is greater than or equal to 65%, more preferably within a range of 65-75%.

More preferably, the percentage of the pore volume occupied by pores below 2 nm to the total pore volume in the composite material is greater than or equal to 45%, further preferably within a range of 45-55%.

More preferably, the percentage of the pore volume occupied by pores of 2-3 nm to the total pore volume in the composite material is within a range of 15-35%.

More preferably, the percentage of the pore volume occupied by pores larger than 3 nm to the total pore volume in the composite material is within a range of 20-35%.

The composite material with a pore size distribution in the above-mentioned preferred ranges has more excellent desulfurization performance.

Figure 3:
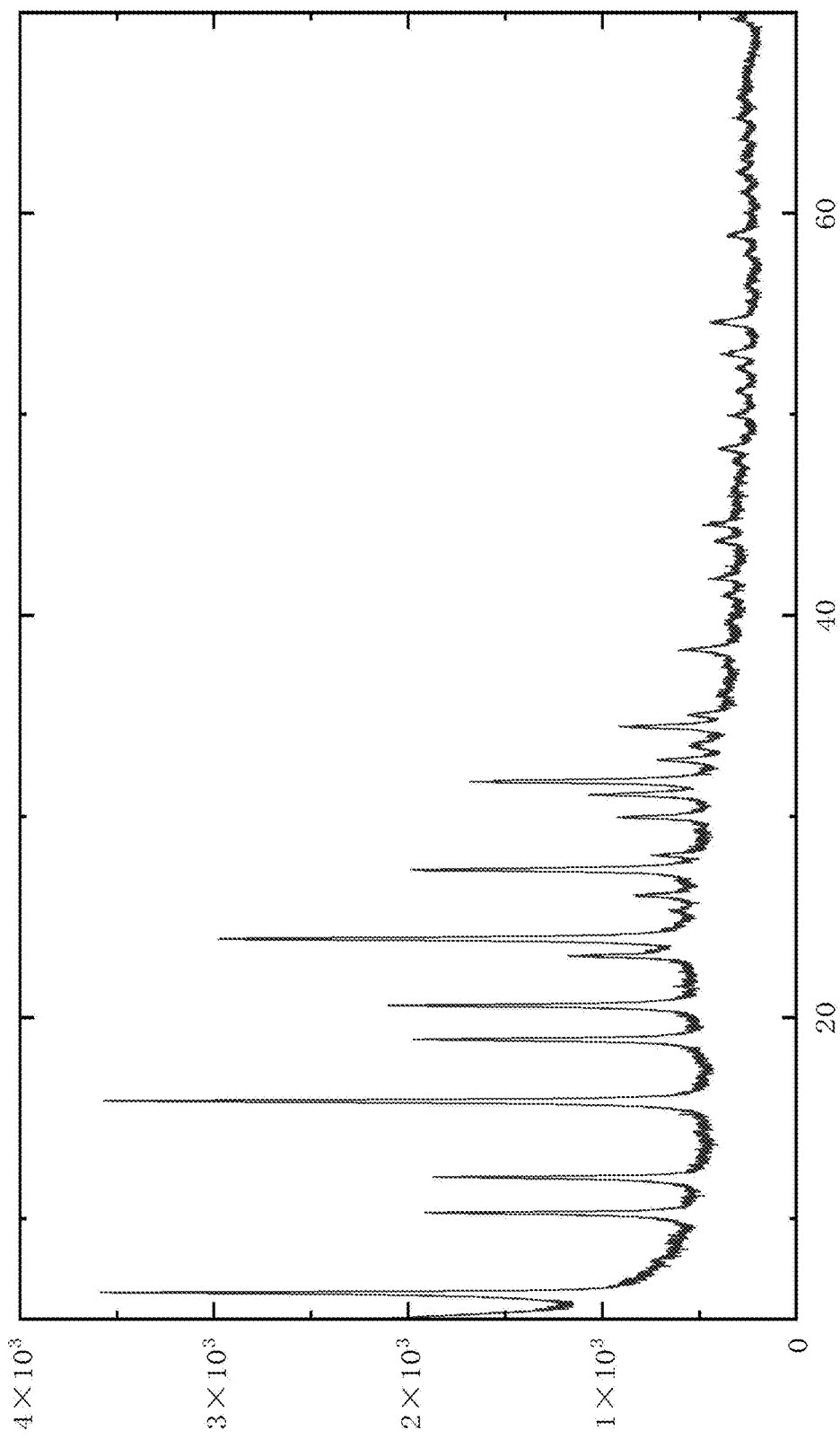
FIG. 3 shows an X-ray diffraction chromatogram of a composite material according to one embodiment of the present disclosure.

Preferably, the composite material has an X-ray diffraction chromatogram substantially as shown in FIG. 3. The composite material has an X-ray diffraction chromatogram substantially as shown in Table 1-a below:

TABLE 1-a

| 2θ(°) | d-spacing(Å) |
|---|---|
| 6.27-6.33 | 13.95-14.05 |
| 10.24-10.33 | 8.51-8.68 |
| 12.02-12.09 | 7.29-7.38 |
| 15.8-15.87 | 5.56-5.63 |
| 18.87-18.93 | 4.67-4.71 |
| 20.54-20.62 | 4.29-4.33 |
| 22.99-23.09 | 3.84-3.88 |
| 23.82-23.95 | 3.69-3.75 |
| 27.29-27.36 | 3.25-3.27 |
| 31.02-31.12 | 2.86-2.89 |
| 31.68-31.73 | 2.81-2.83 |

As can be seen, the composite material has a similar XRD chromatogram with the unmodified molecular sieve, and the characteristic diffraction peak of other oxide is not discovered. It demonstrates that each of the modified molecular sieves retains the original structure of the molecular sieve, and there is not an appearance of a newly added structure. The introduction of the rare earth metal does not destroy the skeleton structure of the molecular sieve, and the rare earth metal is in a uniformly dispersed state on the molecular sieve. In addition, the characteristic diffraction peaks of the rare earth metal-modified molecular sieve are significantly reduced compared with the molecular sieves, due to the higher absorption coefficient of the rare earth metal oxide.

According to the present disclosure, the weight ratio between the auxiliary agent and the molecular sieve is preferably (0.8-4):100, more preferably (1.2-3.3):100, such as 1.2:100, 1.5:100, 1.8:100, 2:100, 2.5:100, 2.6:100, 2.7:100, 2.8:100, 3:100, 3.3:100, or any value between the aforementioned numerical values.

According to the present disclosure, the auxiliary agent may be an existing metal oxide with auxiliary desulfurization function, such as an oxide of a group VIB or group VIII metal, and in particular, the auxiliary agent is preferably at least one of an oxide of nickel, an oxide of cobalt, and an oxide of molybdenum.

In accordance with the present disclosure, the oxide of nickel may be a common oxide of nickel with different valence states, particularly the oxide obtained after subjecting a conventional precursor of nickel to a high temperature calcinating. Preferably, the oxide of nickel is NiO.

According to the present disclosure, the oxide of cobalt may be a common cobalt oxide with different valence state, in particular the oxide obtained after subjecting a conventional precursor of cobalt to a high temperature calcinating. Preferably, the oxide of cobalt is CoO.

According to the present disclosure, the oxide of molybdenum may be a common molybdenum oxide with different valence states, in particular the oxide obtained after subjecting a conventional precursor of molybdenum to a high temperature calcinating. Preferably, the oxide of molybdenum is $MoO_3$.

According to a preferred embodiment of the present disclosure, the composite material has a specific surface area greater than or equal to 550 m²/g, more preferably 558-580 m²/g.

According to a preferred embodiment of the present disclosure, the composite material has a pore volume greater than or equal to 0.25 ml/g, more preferably 0.26-0.3 ml/g.

According to a preferred embodiment of the present disclosure, the composite material has a saturated sulfur volume greater than or equal to 12%, more preferably 12-15%.

According to a preferred embodiment of the present disclosure, the composite material has a sulfur breakthrough capacity greater than or equal to 10%, more preferably 10-11%.

According to a preferred embodiment of the present disclosure, the molecular sieve complex or the composite material of the present disclosure does not contain a detectable amount of Sc, Ti, V, Cr, Mn, Fe, Cu, Zn, W, Ru, Rh, Pd, Ag, Cd, Au, Y or Pt. More preferably, the molecular sieve complex or the composite material of the present disclosure is only composed of the aforementioned ingredients.

The present disclosure provides a method for preparing a composite material, wherein the method comprises the following steps:

(1) Blending and kneading, molding, drying, and calcinating an aluminum precursor, an alkaline earth metal precursor, a rare earth-modified molecular sieve, and optionally a non-metallic binder in the presence of a solvent, wherein the rare earth-modified molecular sieve is a molecular sieve doped with a rare earth element; the aluminum precursor, the alkaline earth metal precursor, and the rare earth-modified molecular sieve are used in an amount such that the contents of the aluminum element, the alkaline earth metal element, the rare earth element and the molecular sieve in the produced molecular sieve complex satisfies formula I;

(2) Contacting a precursor of an auxiliary agent with the molecular sieve complex such that the auxiliary agent is loaded on the molecular sieve complex, wherein the precursor of an auxiliary agent is at least one of a nickel precursor, a cobalt precursor and a molybdenum precursor, the precursor of an auxiliary agent is used in an amount such that a weight ratio between the auxiliary agent and the molecular sieve in the composite material is (0.8-4):100;

Wherein the weights of the aluminum element, the alkaline earth metal element, the rare earth element and the auxiliary agent are calculated in terms of the corresponding oxide.

According to the method of the present disclosure, the aluminum precursor and the rare earth-modified molecular sieve are used in an amount such that the weight ratio between the aluminum element and the molecular sieve in the composite material is preferably (8-35):100, more preferably (12-28):100, such as 12:100, 15:100, 18:100, 19:100, 20:100, 25:100, 26:100, 27:100, 28:100 or any value between the aforementioned numerical values.

According to the method of the present disclosure, the precursor of the alkaline earth metal and the rare earth-modified molecular sieve are used in an amount such that the weight ratio between the alkaline earth metal element and the molecular sieve in the composite material is preferably (0.5-3):100, more preferably (0.6-2.1):100, such as 0.6:100, 1:100, 1.1:100, 1.2:100, 1.3:100, 1.8:100, 1.9:100, 2:100, 2.1:100 or any value between the aforementioned numerical values.

According to the method of the present disclosure, the rare earth element is used in an amount such that the weight ratio between the rare earth element and the molecular sieve in the composite material is preferably (2.5-10):100, more preferably (3.7-9.3):100, such as 3.7:100, 4:100, 5:100, 5.1:100, 5.4:100, 5.5:100, 6:100, 6.4:100, 6.5:100, 6.9:100, 7.5:100, 7.9:100, 8:100, 9.2:100, 9.3:100 or any value between the aforementioned numerical values.

According to the method of the present disclosure, the precursor of the auxiliary agent is used in an amount such that the weight ratio between the auxiliary agent and the molecular sieve in the composite material is preferably (1.2-3.3):100, such as 1.2:100, 1.5:100, 1.8:100, 2:100, 2.5:100, 2.6:100, 2.7:100, 2.8:100, 3:100, 3.3:100 or any value between the aforementioned numerical values.

The present disclosure does not impose specific limitation on the precursor of aluminum, but preferably, the precursor of aluminum is an oxide of aluminum and/or a hydroxide of aluminum, more preferably aluminum hydroxide and/or pseudo-boehmite.

According to the present disclosure, there is no particular requirement for the precursor of the alkaline earth metal, the precursor of the alkaline earth metal is preferably at least one selected from the group consisting of an oxide of the alkaline earth metal, a hydroxide of the alkaline earth metal, a carbonate of the alkaline earth metal and a nitrate of the alkaline earth metal, more preferably at least one selected from the group consisting of calcium oxide, calcium carbonate, calcium nitrate, magnesium oxide, magnesium carbonate, magnesium nitrate, barium oxide and barium carbonate.

According to the present disclosure, the rare earth element may be a common rare earth element, such as lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), yttrium (Y), and scandium (Sc). Preferably, the rare earth element is Ce and/or La. Further preferably, the rare earth elements are Ce and La, and the weight ratio of Ce to La is 1-3. Selection of the preferred oxide of the rare earth element can further improve the adsorption properties of the finally prepared composite material.

According to the present disclosure, the rare earth-modified molecular sieve may be a conventional rare earth-modified molecular sieve, in particular a rare earth-modified Y-type molecular sieve, preferably a rare earth-modified NaY molecular sieve. In the rare earth-modified molecular sieve, the rare earth element is bonded to the pores of the molecular sieve in the form of cation.

According to the present disclosure, the non-metallic binder is an optionally used substance, an use of the non-metallic binder facilitates the formation of the molecular sieve complex. The present disclosure does not impose specific limitation on dosage of the non-metallic binder, but the weight ratio of the molecular sieve to the non-metallic binder is preferably 100:(1-3).

According to the present disclosure, the non-metallic binder may be a variety of existing binders which do not contain metallic elements, the non-metallic binder is preferably an organic acid and/or an inorganic acid, further preferably at least one selected from the group consisting of nitric acid, hydrochloric acid, sulfuric acid and citric acid.

According to the present disclosure, the rare earth-modified molecular sieve may be obtained through a conventional mode, for example, the method of preparing the rare earth-modified molecular sieve comprises: mixing (performing ion exchange) a molecular sieve with a water-soluble salt of a rare earth metal under the condition of a pH=3 to 5. Preferably, the molecular sieve has a Si/Al ratio of 2-10, more preferably 4.5-7. Preferably, the molecular sieve has a specific surface area greater than or equal to 600 m²/g, more preferably within a range of 700-1,000 m²/g. Preferably, the molecular sieve has a pore volume greater than or equal to 0.3 ml/g, more preferably within a range of 0.3-0.35 ml/g. More preferably, the molecular sieve is a NaY molecular sieve. In the molecular sieve, the percentage of the pore volume occupied by pores below 2 nm to the total pore volume is within a range of 20-35%, the percentage of the pore volume occupied by pores of 2-3 nm to the total pore volume is within a range of 10-26%, the percentage of the pore volume occupied by pores larger than 3 nm to the total pore volume in the molecular sieve complex is within a range of 40-65%. The water-soluble salt of the rare earth metal may be various substances that are soluble in water to produce the rare earth metal ions, preferably the water-soluble salt of the rare earth metal is a nitrate of the rare earth metal and/or a chloride of the rare earth metal, more preferably at least one of cerium nitrate, cerium chloride, lanthanum nitrate and lanthanum chloride. The mixing conditions are not particularly limited in the present disclosure, but it is preferable that the mixing conditions comprise a temperature of 70-90° C. Preferably, the mixing conditions further comprise a time period of 20 min to 3 h. In order to increase the content of the rare earth element (enhance the exchange depth of the rare earth ion) in the rare earth-modified molecular sieve, the method may further comprise drying and calcinating (at the temperature 500-600° C. for 3-6 h) the mixed product, and further blending (performing secondary exchange) the molecular sieve with the water-soluble salt of the rare earth metal under the condition comprising a pH=3 to 5.

According to the present disclosure, the conditions for drying may comprise a drying temperature of 100-160° C., preferably 110-130° C. The conditions for drying may further comprise a drying time of 4-6 h.

In accordance with the present disclosure, the conditions of calcinating may comprise a calcinating temperature within a range of 400-700° C., preferably within a range of 450-600° C. The conditions of calcinating may further comprise a calcinating time within a range of 3-8 h, preferably within the range of 4-6 h.

In accordance with the present disclosure, the precursor of auxiliary agent is at least one of a soluble nickel salt, a soluble cobalt salt and a soluble molybdenum salt, preferably at least one selected from the group consisting of nickel nitrate, cobalt nitrate, molybdenum nitrate, nickel chloride, cobalt chloride and molybdenum chloride, nickel sulfate, cobalt sulfate and molybdenum sulfate.

According to the present disclosure, the condition of drying in step (1) may comprise a drying temperature of 100-160° C., preferably 110-130° C. The conditions for drying may further comprise a drying time of 4-6 h.

In accordance with the present disclosure, the conditions of calcinating in step (1) may comprise a calcinating temperature within a range of 400-700° C., preferably within a range of 450-600° C. The conditions of calcinating may further comprise a calcinating time of 3-8 h, preferably 4-6 h.

According to the present disclosure, the molecular sieve complex in step (2) may be loaded with the auxiliary agent in a conventional manner, and preferably, the molecular sieve complex is loaded with the auxiliary agent by impregnating the molecular sieve complex with a solution of a precursor containing the auxiliary agent at an equivalent-volume, drying the impregnated material, and calcinating the dried product.

More preferably, the conditions of equivalent-volume impregnation comprise a temperature within the range of 5-40° C., further preferably within the range of 20-30° C. More preferably, the conditions of equivalent-volume impregnation further comprise a time within the range of 20 min-2.5 h, further preferably within the range of 0.5-1 h.

More preferably, the conditions of drying the impregnated material comprises a temperature within a range of 80-160° C., further preferably within a range of 110-130° C. More preferably, the conditions drying the impregnated material further comprise a time of 2-10 h, further preferably 4-6 h.

More preferably, the conditions of calcinating the dried product comprise a calcinating temperature within a range of 300-500° C., further preferably within a range of 350-450° C. More preferably, the conditions of calcinating the dried product may further comprise a calcinating time within a range of 2-10 h, preferably within the range of 3-5 h.

The method of the present disclosure does not impose special requirement on the solvent, which may be a common organic solvent and/or an inorganic solvent. However, it is preferable that the solvent is water. Those skilled in the art can control the dosage of the solvent according to the requirements of blending, kneading and molding, the relevant content will not be further described herein.

According to the method of the present disclosure, the blending, kneading and molding may be performed in a conventional manner, for example, by means of a molding apparatus, such as a strip extruder.

The present disclosure also provides a composite material prepared with the aforementioned method.

The present disclosure also provides an use of the aforementioned modified activated carbon or composite material in adsorption desulfurization, particularly in adsorption desulfurization of the samples having a low sulfur content, such as the gas samples having a sulfur dioxide content no more than 0.2 vol. % (i.e., 6,000 mg/m³), e.g., the flue gas.

The present disclosure further provides a desulfurization method, the method comprises: contacting the sulfur-containing gas to be treated with the aforementioned composite material; Alternatively, the method comprises: preparing a composite material according to the aforementioned method; then contacting the sulfur-containing gas with the produced composite material.

The desulfurization method according to the present disclosure is particularly suitable for removal of sulfur contained in samples having a relatively low sulfur content, therefore, the sulfur dioxide content of the sulfur-containing gas is preferably not greater than 0.2 vol. %. On the other hand, when the sulfur dioxide content of the sulfur-containing gas is greater than 0.2 vol. %, the method preferably further comprises a step of reducing the sulfur dioxide content of the sulfur-containing gas to below 0.2 vol. % prior to contacting it with the composite material.

The desulfurization method of the present disclosure does not impose the special requirements on the contacting conditions, but the contacting conditions preferably include a temperature of 100-150° C. It is Preferable that the contacting conditions further include a gas volume hourly space velocity within a range of 1,500-2,000 h$^{-1}$.

According to the present disclosure, the composite material not only has desirable adsorbability, but also has excellent regeneration properties. Therefore, the method further comprises regenerating the composite material. The present disclosure does not impose the special requirements on the regeneration method, for example, the regeneration mode may be thermal regeneration and/or water wash regeneration. The composite material of the present disclosure may be subjected to the thermal regeneration and/or water wash regeneration under the conventional conditions.

More preferably, the thermal regeneration mode is carried out by a gas purge, the conditions of gas purge comprise a gas volume hourly space velocity within a range of 1,000-1,500 $h^{-1}$, a temperature of 150-250° C., and the purge gas is a non-reactive gas or an inert gas (e.g., nitrogen gas).

More preferably, the conditions of water wash regeneration comprise a liquid hourly space velocity within a range of 0.5-1.5 $h^{-1}$ and a temperature of 25-40° C.

According to the desulfurization method of the present disclosure, the sulfur-containing gas is at least one of the heating furnace exhaust gas of the petroleum refining industry, sulfur tail gas and catalytic cracking regenerative flue gas.

The present disclosure also provides a system with a desulfurization function, wherein the system comprises:

an oxidation unit for treating sulfur-containing gas and recovering sulfur;

a hydrogenation purification unit, which is connected with the oxidation unit for subjecting the oxidation tail gas discharged from the oxidation unit to hydrogenation reduction and recovering hydrogen sulfide in the reduced product obtained from the hydrogenation reduction;

an incineration unit for incinerating the purified tail gas discharged from the hydrogenation purification unit;

an adsorption unit for adsorbing $SO_2$ from the $SO_2$-containing flue gas obtained by incineration, wherein the adsorbent used in the adsorption unit is the aforementioned composite material.

In accordance with the system of the present disclosure, in order to facilitate regeneration of the composite material in the adsorption unit, the adsorption unit comprises an inlet and an outlet of substance used for regeneration, thereby facilitating introduction of the substance used for regeneration (heat source or washing water) into the adsorption unit for regenerating the composite material. It is preferably that the adsorption unit is further connected with the oxidation unit, such that the $SO_2$-containing regenerative gas obtained from regeneration is returned to the oxidation unit and subjected to retreatment.

Figure 2:
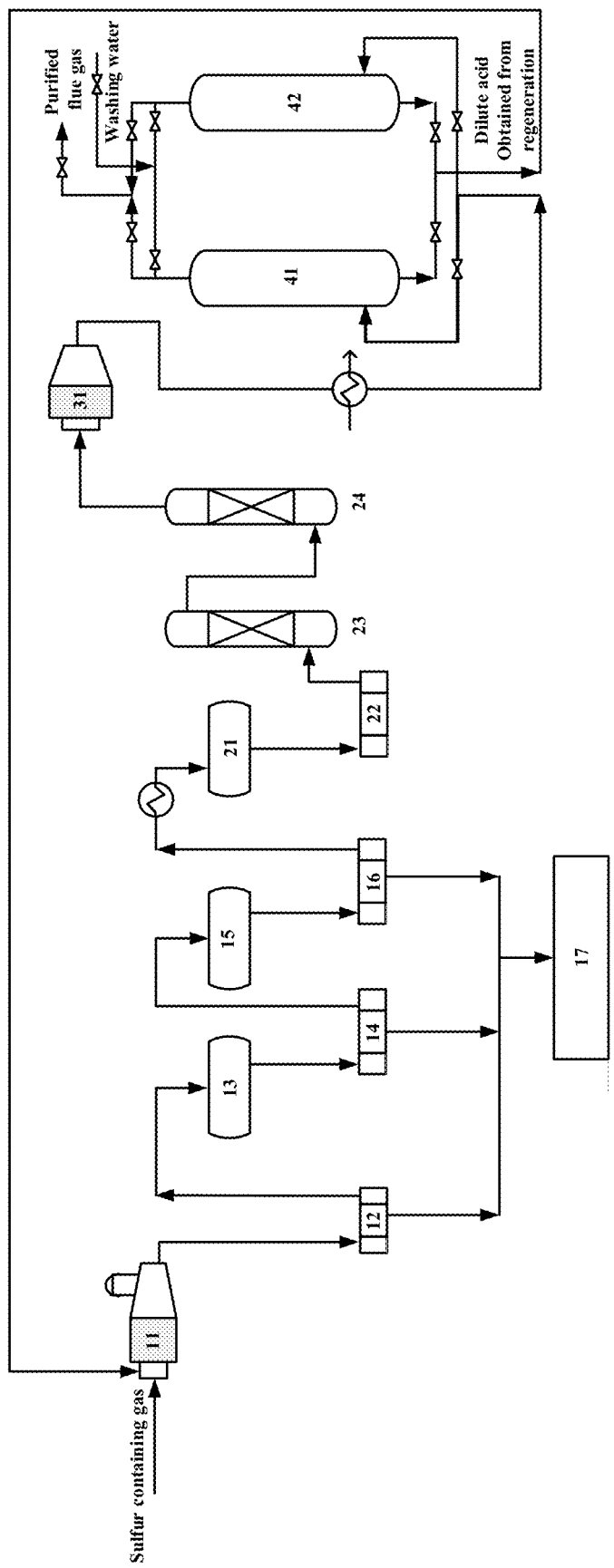
FIG. 2 illustrates a schematic structure diagram of a system according to another preferred embodiment of the present disclosure.

In order to perform continuous operation of the system according to the present disclosure, it is preferable that the adsorption unit comprises at least two adsorption towers (e.g., a first adsorption tower 41 and a second adsorption tower 42) for an alternate use to continuously adsorb $SO_2$ in the $SO_2$-containing flue gas obtained from the incineration. When the composite material is regenerated by means of the thermal regeneration, as shown in FIG. 1, the hot gas (e.g., hot nitrogen gas) may be introduced from the bottom of the adsorption tower, the produced regenerative gas is discharged from the top of the adsorption tower, an oxidation unit may be further introduced for performing retreatment. When the composite material is regenerated by means of the water wash regeneration, as shown in FIG. 2, the washing water may be introduced from the top of the adsorption tower, the produced regenerated dilute acid is discharged from the bottom of the adsorption tower, an oxidation unit may be further introduced for carrying out retreatment.

According to the system of the present disclosure, the oxidation unit may comprise a liquid sulfur pool 17 and a thermal reaction furnace 11, a first stage condenser 12 and a catalytic converter which are connected in sequence, wherein the liquid sulfur pool 17 is connected with the first stage condenser 12 and the catalytic converter so as to collect the cooled liquid sulfur. In order to recover sulfur in a more efficient manner, the oxidation unit preferably comprises a liquid sulfur pool 17 and a thermal reaction furnace 11, a first stage condenser 12, a primary catalytic converter 13, a second stage condenser 14, a secondary catalytic converter 15 and a third stage condenser 16 which are connected in sequence; the liquid sulfur pool 17 is connected with the first stage condenser 12, the second stage condenser 14 and the third stage condenser 16 respectively, so as to collect the cooled liquid sulfur.

According to the system of the present disclosure, the hydrogenation purification unit may comprise a hydrogenation reactor 21, a hydrogenation tail gas cooler 22, a quench tower 23 and an absorption tower 24 which are connected in sequence. The oxidation tail gas discharged from the oxidation unit is subjected to hydrogenation reduction in the hydrogenation reactor 21, and then cooled in the hydrogenation tail gas cooler 22 and the quench tower 23, and subsequently entered into the absorption tower 24 to absorb hydrogen sulfide in the reduction product.

According to the system of the present disclosure, the incineration unit may be an incinerator and/or a catalytic incineration reactor.

According to the system of the present disclosure, the oxidation unit, the hydrogenation purification unit and the incineration unit are used for reducing the content of sulfur in a sulfur-containing gas, which is mainly composed of hydrogen sulfide, the adsorption unit provided with an adsorbent material is used for further reducing the content of sulfur dioxide.

The present disclosure also provides a method for desulfurization, wherein the method comprises the following steps:

(a) oxidizing the sulfur-containing gas to be treated and recovering the sulfur;

(b) subjecting the oxidized tail gas to hydrogenation reduction and recovering hydrogen sulfide from the reduction product obtained from the hydrogenation reduction;

(c) incinerating the tail gas obtained after the hydrogenation reduction;

(d) contacting the incinerated $SO_2$-containing flue gas with a sorbent to adsorb $SO_2$, the sorbent is the aforementioned composite material.

The present disclosure does not impose special requirements on the conditions of contact in step (d), but preferably, the conditions of contact comprise a temperature within the range of 100-150° C. Preferably, the conditions of contact further comprise a gas volume hourly space velocity within the range of 1,500-2,000 $h^{-1}$.

In accordance with the present disclosure, the composite material not only has desirable adsorbability, but also has excellent regeneration property. Therefore, the method further comprises regenerating the adsorbent. The present disclosure does not impose the special requirements on the regeneration method, for example, the regeneration mode may be thermal regeneration and/or water wash regeneration. The composite material of the present disclosure may be subjected to the thermal regeneration and/or water wash regeneration under the conventional conditions. In order to further ensure zero emission of sulfur, the method also comprises regenerating the adsorbent, and returning the $SO_2$-containing regenerative gas obtained from the regeneration process to step (a) and subjecting to retreatment.

More preferably, the thermal regeneration mode is carried out by a gas purge, the conditions of gas purge comprise a gas volume hourly space velocity within a range of 1,000-

1,500 h$^{-1}$, a temperature of 150-250° C., and the purge gas is a non-reactive gas or an inert gas (e.g., nitrogen). More preferably, the conditions of water wash regeneration comprise a liquid hourly space velocity within a range of 0.5-1.5 h$^{-1}$ and a temperature of 25-40° C.

Those skilled in the art can select the time of regeneration, as long as the sulfur capacity of the regenerated composite material is recovered to 95% or more of the composite material at its initial condition.

The present disclosure does not impose special requirement on the oxidation process in step (a), as long as the sulfur-containing gas is subjected to the Claus reaction to obtain sulfur. For example, the oxidation process may comprise the following steps: the sulfur-containing gas is successively subjected to combustion, first-stage cooling and catalytic reaction.

Preferably, the conditions of combustion comprise a temperature within the range of 900-1,400° C. and a residence time of 2-3 seconds. In the present disclosure, the term "residence time" refers to the residence time of the sulfur-containing gas in the combustion vessel, i.e. the time for the sulfur-containing gas to pass through the combustion furnace, namely the reaction time of the gas.

Preferably, the conditions of the first stage cooling cause that a temperature of the cooled gas is within a range of 120-180° C.

Preferably, the conditions of catalytic reaction comprise: the catalyst is an aluminium oxide-based catalyst and/or a titania-based catalyst, the gas volume hourly space velocity is within a range of 500-1,000 h$^{-1}$, and the temperature is within the range of 200-350° C.

More preferably, the mode of catalytic reactions comprises the primary catalytic reaction, the second stage cooling, the secondary catalytic reaction and the third stage cooling which are carried out in sequence. Further preferably, the conditions for the primary catalytic reaction comprise that the catalyst is an aluminium oxide-based catalyst and/or a titania-based catalyst, the gas volume hourly space velocity is within a range of 600-800 h$^{-1}$, and the temperature is within the range of 290-330° C. Further preferably, the conditions for the second stage cooling cause that the temperature of the cooled gas is within a range of 130-160° C. Further preferably, the conditions for the secondary catalytic reaction comprise that the catalyst is an aluminium oxide-based catalyst, the gas volume hourly space velocity is within a range of 600-800 h$^{-1}$, and the temperature is within the range of 220-250° C. Further preferably, the conditions for the third stage cooling cause that the temperature of the cooled gas is within a range of 130-160° C.

In the present disclosure, the aluminium oxide-based catalyst is composed of $Al_2O_3$ as the main ingredient, and has a specific surface area equal to or larger than 350 m$^2$/g, a pore volume equal to or larger than 0.45 ml/g, the catalyst is commercially available, for example, the catalyst is LS-02 catalyst purchased from the Shandong Qilu Keli Chemical Institute Co., Ltd. The titania-based catalyst is composed of $TiO_2$ as the main ingredient, and has a specific surface area equal to or larger than 180 m$^2$/g, a pore volume equal to or larger than 0.3 ml/g, the catalyst is commercially available, for example, the catalyst is LS-981 catalyst purchased from the Shandong Qilu Keli Chemical Institute Co., Ltd.

According to the present disclosure, the conditions for the hydrogenation reduction in step (b) may comprise that the hydrogenation catalyst is a Co—Mo-based tail gas hydrogenation catalyst, the gas volume hourly space velocity is within the range of 500-1,000 h$^{-1}$, and the temperature is within the range of 220-350° C. Preferably, the mode of recovering the hydrogen sulfide in the reduction product obtained from the hydrogen reduction is as follows: lowering the temperature of the reduction product obtained by the hydrogen reduction to 30-40° C., and using an amine liquid to absorb the hydrogen sulfide in the product after lowering the temperature. The concentration of amine in the amine liquid may be 20-50 wt. %. The amine in the amine liquid may be various alcohol amine based desulfurizers, wherein a composite type Methyldiethanolamine (MDEA) is preferred. The amine liquid may be KMKTS-15 high efficiency desulfurizer commercially available from the Zibo Kaimeike Trade Co., Ltd.

In the present disclosure, the Co—Mo based tail gas hydrogenation catalyst may be a low temperature hydrogenation catalyst for Claus tail gas, which uses the modified $Al_2O_3$ as the carrier, and is composed of active metal ingredients such as cobalt and molybdenum, it has a specific surface area equal to or larger than 200 m$^2$/g, and is commercially available, for example, the catalyst is the LSH-02 catalyst purchased from the Shandong Qilu Keli Chemical Institute Co., Ltd. The Co—Mo based tail gas hydrogenation catalyst can also be a specific catalyst for Claus tail gas hydrogenation, which uses the modified $Al_2O_3$ as the carrier, and is composed of active metal ingredients such as cobalt and molybdenum, it has a specific surface area equal to or larger than 300 m$^2$/g, and is commercially available, for example, the catalyst is the LS-951T catalyst purchased from the Shandong Qilu Keli Chemical Institute Co., Ltd.

According to the present disclosure, the conditions of incineration in the step (c) may comprise a temperature within the range of 600-800° C. and a residence time of 2-3 seconds.

According to the present disclosure, the incineration in step (c) may be performed with the conventional incineration mode. Preferably, the incineration mode is catalytic incineration. The conditions of the catalytic incineration comprise that the catalyst is a catalytic incineration catalyst containing iron and vanadium, the temperature is within a range of 250-350° C., the gas volume hourly space velocity is within a range of 500-1,000 h$^{-1}$. The specific composition of the catalytic incineration catalyst containing iron and vanadium comprise: $Fe_2O_3$ 2-8 wt. %, $V_2O_5$ 1-4 wt. %, and the balance is white carbon black.

According to the present disclosure, the content of $CO_2$ in the sulfur-containing gas is 3-5%, the content of $SO_2$ is 20-1,000 ppm by volume, the content of NOx is 20-150 ppm by volume, the content of $O_2$ is 3-5%, the content of $H_2O$ is 3-10 wt. %.

According to the present disclosure, the method is implemented in the aforementioned system.

EXAMPLES

The present disclosure will be described in detail with reference to examples. In the following examples:

The molecular sieve raw powder was purchased from Qilu Branch of Sinopec Catalyst Co., Ltd.;

The alkaline silica sol was commercially available from the Qingdao Zhongneng Silicon Chemical Co., Ltd.;

The dried aluminum hydroxide gel was purchased from Yangzhou Dilan Chemical Raw Material Co., Ltd. in Jiangsu Province of China;

The pseudo-boehmite was commercially available from Dezhou Jinghuo Technique Glass Co., Ltd. in Shandong Province of China;

The extruding machine had a model number ZYDJ-30, the manufacturer was Zibo Yuecheng Machinery Co., Ltd.;

The method of measuring the elemental composition was X-ray fluorescence method, the specific detection process was in compliance with the National Standard GB/T 30905-2014 of China, the method was used in conjunction with X-ray photoelectron energy spectrum analysis to determine the valence state of the elements; the molecular sieve and $Al_2O_3$ in Table 2 and Table 3 were shown in the feeding amounts;

The detection methods of pore volume fraction, specific surface area and pore volume were performed with reference to the National Standard GB/T6609.35-2009 of China;

The measurement method of the XRD spectrogram was performed with reference to the enterprise standard Q/SH3160.R064-2007.

Example 1

800 g of molecular sieve raw powder (NaY molecular sieve with a Si/Al ratio of 5, a specific surface area of 850 m$^2$/g, a pore volume of 0.32 ml/g, wherein the percentage of the pore volume occupied by pores below 2 nm to the total pore volume in the molecular sieve was 32.7%, the percentage of the pore volume occupied by pores of 2-3 nm to the total pore volume was 22.8%, the percentage of the pore volume occupied by pores larger than 3 nm to the total pore volume was 44.5%) was weighted and taken into a beaker, distilled water was added such that the weight ratio of water/molecular sieve reached 8 or so. 76 g of cerium chloride (CeCl$_3$·6H$_2$O) and 30 g of lanthanum chloride (LaCl$_3$) were weighted and prepared into a rare earth chloride solution. The rare earth chloride solution was added into the beaker and stirred uniformly, hydrochloric acid was used for adjusting pH to about 4, the beaker was placed in a water bath and heated to about 80° C., the exchange was performed for 1 hour under the stirring state, and the exchange process was finished. The product was subjected to cooling, filtering, washing and drying. The molecular sieve obtained after exchanging for the first time was subjected to calcinating in order to increase the exchange depth of the rare earth ions, the calcinating was performed at 550° C. for 4 hours. After the calcinating process, the molecular sieve was subjected to the secondary exchange according to the aforementioned method so as to obtain a modified molecular sieve.

The obtained modified molecular sieve, dried aluminum hydroxide glue (330 g, with a solid content of 70 wt %, a specific surface area of 450 m$^2$/g, and a pore volume of 0.9 mL/g), 10 g of calcium oxide and 450 g of deionized water were mixed uniformly, 12 g of nitric acid was added as a binder; the materials were extruded on an extruder to obtain the strip-shaped materials having a size of φ 3-5 mm×10 mm, which were initially subjected to drying at 120° C. for 4 hours and then subjected to calcinating at 500° C. for 4 hours, in order to produce a molecular sieve complex (or an adsorbent carrier), the specific surface area and pore volume of the molecular sieve complex were measured, the results were shown in Table 4.

78 g of nickel nitrate (Ni(NO$_3$)$_2$·6H$_2$O) was dissolved and the metered volume was performed according to the water absorption of the produced molecular sieve complex, so as to form a stable co-immersion liquid. The co-immersion liquid was taken and used for impregnating the adsorbent carrier at an equivalent-volume, the impregnation temperature was 25° C., and the impregnation time was 1 hour, the impregnated materials were subjected to drying at 120° C. for 6 hours and calcinating at 500° C. for 4 hours, in order to produce an adsorbent. The measurement results of the elemental composition (in wt %) of the adsorbent were shown in Table 2, the measurement results of the specific surface area and pore volume of the adsorbent were illustrated in Table 4. The XRD spectrogram data for the adsorbent was illustrated in Table 2-1. The XRD spectrogram was shown in FIG. 3.

Examples 2-7

The adsorbents were prepared according to the same steps and conditions of Example 1, except that the ingredients, preparation conditions or the concentration of impregnation solution were modified, the specific preparation conditions were illustrated in Table 1; the contents of metal oxides and molecular sieve (in wt. %) of the finally produced adsorbent products were shown in Table 2, the measurement results of the specific surface area and other parameters were illustrated in Table 4. The XRD spectrogram data for the adsorbents were illustrated in Table 2-2 to Table 2-7, each of the XRD spectrograms was similar with that in FIG. 3.

TABLE 1

| | No. of Examples | Example 2 | Example 3 | Example 4 | Example 5 | Example 6 | Example 7 |
|---|---|---|---|---|---|---|---|
| Molecular sieve raw powder | Types | NaY (with a Si/Al ratio of 4.5) | NaY (with a Si/Al ratio of 6) | NaY (with a Si/Al ratio of 5.5) | NaY (with a Si/Al ratio of 4.8) | NaY (with a Si/Al ratio of 6.5) | NaY (with a Si/Al ratio of 7) |
| | Specific surface area | 800 m$^2$/g | 850 m$^2$/g | 880 m$^2$/g | 821 m$^2$/g | 875 m$^2$/g | 916 m$^2$/g |
| | Pore volume | 0.35 ml/g | 0.3 ml/g | 0.32 ml/g | 0.33 ml/g | 0.34 ml/g | 0.33 ml/g |
| | Percentage of the pore volume occupied by-pores below 2 nm to the total pore volume | 32.7% | 33.6% | 33.8% | 30.5% | 34.2% | 32.5% |
| | percentage of the pore volume occupied by pores of 2-3 nm to the total pore volume | 22.8% | 23.7% | 23.2% | 22.8% | 21.5% | 23.5% |
| | percentage of the pore volume occupied by pores larger than 3 nm to the total pore volume | 44.5% | 42.7% | 43.0% | 46.7% | 44.3% | 44.0% |

TABLE 1-continued

| No. of Examples | Example 2 | Example 3 | Example 4 | Example 5 | Example 6 | Example 7 |
|---|---|---|---|---|---|---|
| Precursors of aluminum | Dried aluminum hydroxide gel | Pseudo-boehmite | Dried aluminum hydroxide gel | Dried aluminum hydroxide gel | Pseudo-boehmite | Dried aluminum hydroxide gel |
| Water-soluble rare earth metal salts | Cerium nitrate, lanthanum nitrate | Cerium nitrate, lanthanum chloride | Cerium chloride, lanthanum nitrate | Cerium nitrate, lanthanum nitrate | Cerium chloride, lanthanum chloride | Cerium nitrate, lanthanum nitrate |
| Precursors for alkaline earth metals | Calcium carbonate | Calcium nitrate | Calcium oxide | Calcium oxide | Calcium carbonate | Calcium nitrate |
| Adhesive | Nitric acid | Sulfuric acid | Nitric acid | Nitric acid | Sulfuric acid | Nitric acid |
| Auxiliary agent | Nickel chloride | Nickel sulfate | Nickel nitrate | Nickel nitrate | Nickel chloride | Nickel nitrate |
| Drying the carrier | 120° C., 5 h | 130° C., 4 h | 110° C., 6 h | 120° C., 5 h | 115° C., 4 h | 120° C., 5 h |
| Calcinating the carrier | 500° C., 5 h | 480° C., 5 h | 450° C., 6 h | 520° C., 5 h | 600° C., 5 h | 500° C., 5 h |
| Impregnation | 25° C., 1 h | 20° C., 1.5 h | 25° C., 1 h | 25° C., 1 h | 30° C., 30 min | 25° C., 1 h |
| Drying after impregnation | 110° C., 6 h | 120° C., 5 h | 115° C., 6 h | 120° C., 5 h | 130° C., 4 h | 125° C., 5 h |
| Calcinating after impregnation | 450° C., 3 h | 350° C., 6 h | 400° C., 5 h | 450° C., 3 h | 400° C., 3 h | 450° C., 3 h |

TABLE 2

| No. of Examples | $Al_2O_3$ | CaO | NiO | $CeO_2$ | $La_2O_3$ | Molecular sieve | $SiO_2$ | Total aluminum (in terms of $Al_2O_3$) | Whether formula I is satisfied |
|---|---|---|---|---|---|---|---|---|---|
| Example 1 | 15 | 1 | 2 | 3 | 2 | 77 | 62 | 53 | Yes |
| Example 2 | 15 | 1 | 1 | 1.5 | 1.5 | 80 | 63 | 52 | Yes |
| Example 3 | 15 | 1 | 2.5 | 3 | 1 | 77.5 | 65 | 50 | Yes |
| Example 4 | 15 | 0.5 | 2 | 3.5 | 3.5 | 75.5 | 62 | 53 | Yes |
| Example 5 | 10 | 1 | 1.5 | 2.5 | 2 | 83 | 67 | 43 | Yes |
| Example 6 | 20 | 1.5 | 2 | 3.5 | 1.5 | 71.5 | 61 | 59 | Yes |
| Example 7 | 15 | 1.5 | 2 | 3 | 3 | 75.5 | 65 | 50 | Yes |

TABLE 2-1

| Adsorbents | | | Molecular sieve raw powder | | |
|---|---|---|---|---|---|
| $2\theta(°)$ | d-spacing (Å) | Height/counts | $2\theta(°)$ | d-spacing (Å) | Height/counts |
| 6.301 | 14.017 | 2871 | 6.229 | 14.177 | 8209 |
| 10.286 | 8.593 | 1451 | 10.167 | 8.693 | 2168 |
| 12.055 | 7.336 | 1434 | 11.921 | 7.418 | 1632 |
| 15.837 | 5.591 | 2594 | 15.691 | 5.643 | 4465 |
| 18.903 | 4.691 | 1511 | 18.715 | 4.737 | 2326 |
| 20.578 | 4.313 | 1669 | 20.395 | 4.351 | 3446 |
| 23.041 | 3.857 | 966 | 22.837 | 3.891 | 1211 |
| 23.886 | 3.722 | 2379 | 23.681 | 3.754 | 5455 |
| 27.334 | 3.260 | 1621 | 27.079 | 3.290 | 3978 |
| 31.076 | 2.875 | 888 | 30.780 | 2.902 | 2266 |
| 31.708 | 2.820 | 1367 | 31.434 | 2.843 | 4853 |

TABLE 2-2

| Adsorbents | | |
|---|---|---|
| $2\theta(°)$ | d-spacing (Å) | Height/counts |
| 6.296 | 14.023 | 2251 |
| 10.274 | 8.603 | 865 |
| 12.027 | 7.353 | 866 |
| 15.811 | 5.601 | 1999 |
| 18.873 | 4.698 | 973 |
| 20.545 | 4.319 | 1112 |
| 23.017 | 3.861 | 428 |
| 23.874 | 3.724 | 1779 |
| 27.290 | 3.265 | 1131 |
| 31.056 | 2.877 | 427 |
| 31.685 | 2.822 | 928 |

TABLE 2-3

| Adsorbents | | |
|---|---|---|
| $2\theta(°)$ | d-spacing (Å) | Height/counts |
| 6.312 | 13.992 | 2437 |
| 10.256 | 8.650 | 1108 |
| 12.039 | 7.358 | 1085 |
| 15.831 | 5.598 | 2198 |
| 18.905 | 4.689 | 1156 |
| 20.589 | 4.308 | 1258 |
| 23.029 | 3.862 | 456 |
| 23.862 | 3.729 | 1980 |
| 27.328 | 3.262 | 1256 |
| 31.056 | 2.880 | 586 |
| 31.697 | 2.822 | 987 |

TABLE 2-4

| Adsorbents | | |
|---|---|---|
| $2\theta(°)$ | d-spacing (Å) | Height/counts |
| 6.278 | 13.992 | 2315 |
| 10.242 | 8.678 | 1651 |
| 12.025 | 7.378 | 1238 |
| 15.808 | 5.621 | 2651 |
| 18.878 | 4.704 | 1328 |
| 20.543 | 4.328 | 1531 |
| 22.996 | 3.874 | 825 |
| 23.829 | 3.741 | 2185 |
| 27.308 | 3.268 | 1325 |
| 31.028 | 2.886 | 918 |
| 31.687 | 2.825 | 1521 |

TABLE 2-5

| 2θ(°) | d-spacing(Å) | Height/counts |
|---|---|---|
| 6.328 | 13.957 | 3182 |
| 10.326 | 8.515 | 1758 |
| 12.087 | 7.290 | 1821 |
| 15.865 | 5.564 | 2931 |
| 18.925 | 4.678 | 1625 |
| 20.618 | 4.296 | 1356 |
| 23.085 | 3.841 | 1102 |
| 23.946 | 3.699 | 2651 |
| 27.357 | 3.255 | 1856 |
| 31.115 | 2.868 | 956 |
| 31.727 | 2.816 | 1561 |

TABLE 2-6

| 2θ(°) | d-spacing(Å) | Height/counts |
|---|---|---|
| 6.287 | 14.048 | 2785 |
| 10.266 | 8.631 | 1658 |
| 12.042 | 7.354 | 1536 |
| 15.826 | 5.603 | 3120 |
| 18.892 | 4.696 | 1425 |
| 20.558 | 4.321 | 1156 |
| 23.056 | 3.852 | 1081 |
| 23.842 | 3.736 | 2320 |
| 27.318 | 3.265 | 1569 |
| 31.042 | 2.883 | 897 |
| 31.701 | 2.822 | 1210 |

TABLE 2-7

| 2θ(°) | d-spacing(Å) | Height/counts |
|---|---|---|
| 6.309 | 13.999 | 3280 |
| 10.291 | 8.583 | 1687 |
| 12.061 | 7.327 | 2104 |
| 15.842 | 5.587 | 2780 |
| 18.912 | 4.685 | 1389 |
| 20.583 | 4.311 | 1258 |
| 23.062 | 3.850 | 1204 |
| 23.908 | 3.713 | 2356 |
| 27.345 | 3.258 | 1953 |
| 31.085 | 2.874 | 1023 |
| 31.713 | 2.819 | 1278 |

Example 8

The adsorbent was prepared according to the same steps and conditions as those of Example 1, except that the nickel nitrate was replaced by an equal weight (calculated based on metal oxide) of cobalt nitrate, the measurement results of the specific surface area and other parameters were illustrated in Table 4. The XRD spectrogram data of the produced adsorbents was shown in Table 2-8.

TABLE 2-8

| 2θ(°) | d-spacing(Å) | Height/counts |
|---|---|---|
| 6.318 | 13.979 | 3825 |
| 10.312 | 8.542 | 2012 |
| 12.072 | 7.311 | 1789 |
| 15.856 | 5.573 | 2821 |
| 18.921 | 4.680 | 1589 |
| 20.606 | 4.301 | 1256 |
| 23.078 | 3.844 | 1056 |
| 23.932 | 3.704 | 2821 |
| 27.351 | 3.256 | 1678 |
| 31.106 | 2.870 | 1102 |
| 31.723 | 2.817 | 1312 |

Example 9

The adsorbent was prepared according to the same steps and conditions as those of Example 1, except that the nickel nitrate was replaced by an equal weight (calculated based on metal oxide) of molybdenum nitrate, the measurement results of the specific surface area and other parameters were illustrated in Table 4. The XRD spectrogram data of the produced adsorbents was shown in Table 2-9.

TABLE 2-9

| 2θ(°) | d-spacing(Å) | Height/counts |
|---|---|---|
| 6.321 | 13.973 | 2963 |
| 10.320 | 8.527 | 1521 |
| 12.081 | 7.299 | 1756 |
| 15.861 | 5.568 | 2726 |
| 18.916 | 4.683 | 1512 |
| 20.592 | 4.307 | 1121 |
| 23.080 | 3.843 | 987 |
| 23.938 | 3.702 | 2213 |
| 27.349 | 3.257 | 1651 |
| 31.112 | 2.868 | 879 |
| 31.708 | 2.820 | 1375 |

Example 10

The adsorbent was prepared according to the same steps and conditions as those of Example 2, except that the NaY molecular sieve was replaced by the 13X molecular sieve (purchased from Tianjin Damao Chemical Reagent Factory, the molecular sieve had a specific surface area of 724 m²/g, a pore volume of 0.34 ml/g, the percentage of the pore volume occupied by pores below 2 nm to the total pore volume was 28.5%, the percentage of the pore volume occupied by pores of 2-3 nm to the total pore volume was 26%, the percentage of the pore volume occupied by pores larger than 3 nm to the total pore volume was 45.5%), the measurement results of the specific surface area and other parameters were illustrated in Table 4.

Figure 4:
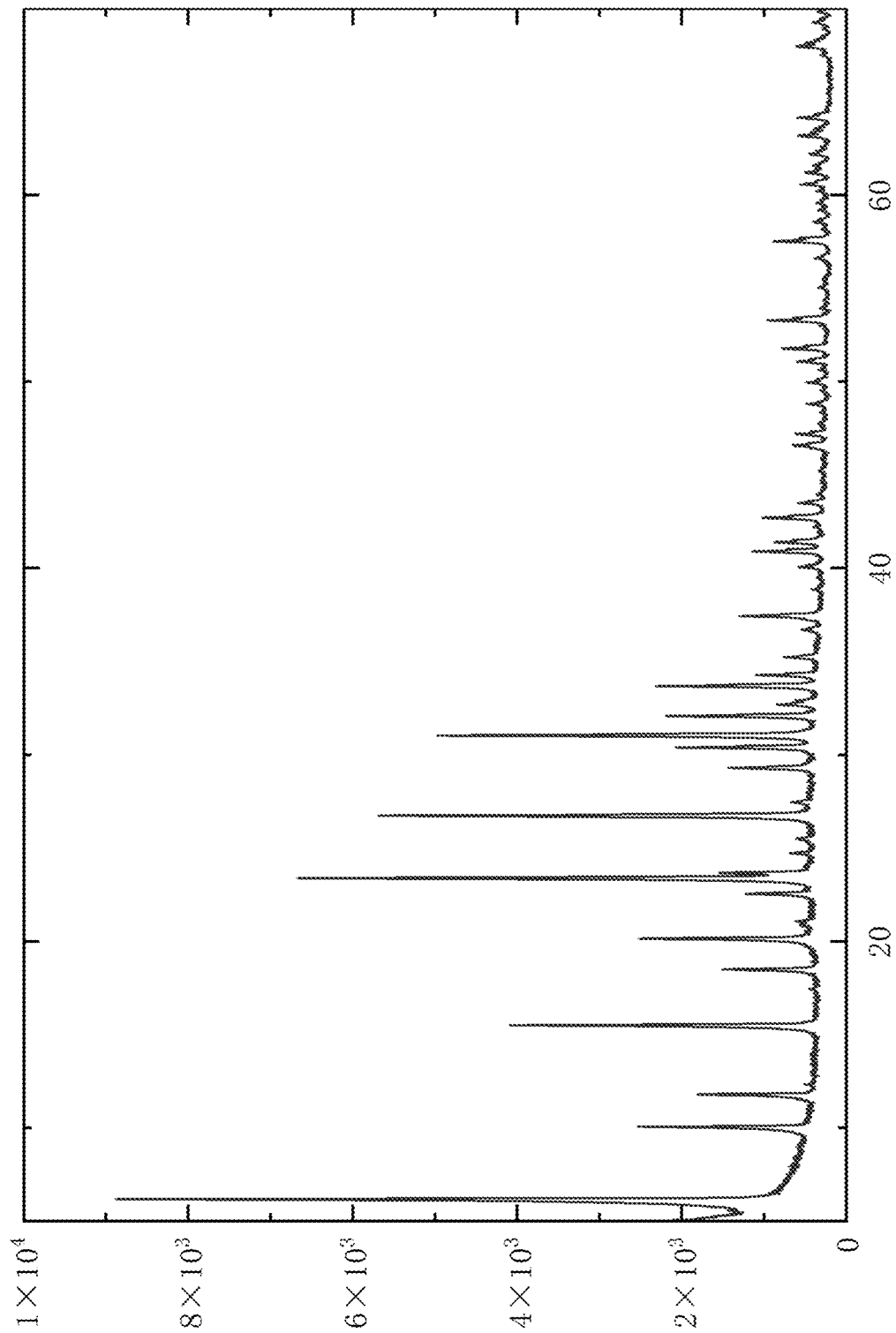
FIG. 4 shows an X-ray diffraction chromatogram of a composite material according to another embodiment of the present disclosure.

The XRD spectrogram data of the produced adsorbent was shown in Table 2-10, and the XRD spectrogram was illustrated in FIG. 4.

TABLES 2-10

Adsorbents

| 2θ(°) | d-spacing(Å) | Height/counts |
|---|---|---|
| 6.178 | 14.295 | 6375 |
| 10.063 | 8.783 | 1928 |
| 11.789 | 7.501 | 1466 |
| 15.494 | 5.714 | 3209 |
| 18.472 | 4.799 | 1223 |
| 20.142 | 4.405 | 2005 |
| 23.388 | 3.801 | 5152 |
| 23.661 | 3.757 | 1210 |
| 26.7425 | 3.331 | 4302 |
| 30.392 | 2.938 | 1728 |
| 31.035 | 2.879 | 4171 |
| 32.086 | 2.787 | 1835 |
| 33.692 | 2.658 | 1957 |

Comparative Examples 1-8

The adsorbent was prepared according to the same steps and conditions as those of Example 1, except that the concentration OF impregnation solution was modified such that the contents (in wt. %) of individual metal oxide and molecular sieve of the finally produced adsorbent products were as shown in Table 3, the measurement results of the specific surface area and other parameters were illustrated in Table 4.

TABLE 3

| Numbers | $Al_2O_3$ | CaO | NiO | $CeO_2$ | $La_2O_3$ | Molecular sieve | $SiO_2$ | Total aluminum (in terms of $Al_2O_3$) | Whether formula I is satisfied |
|---|---|---|---|---|---|---|---|---|---|
| Comparative Example 1 | 15 | 1 | 0 | 3 | 2 | 79 | 64 | 51 | Yes |
| Comparative Example 2 | 15 | 1 | 1 | 0 | 1.5 | 81.5 | 66 | 49 | No |
| Comparative Example 3 | 15 | 1 | 2.5 | 3 | 0 | 78.5 | 64 | 51 | Yes |
| Comparative Example 4 | 15 | 0.5 | 2 | 4 | 4 | 74.5 | 60 | 55 | Yes |
| Comparative Example 5 | 10 | 1 | 1.5 | 1 | 1 | 85.5 | 69 | 41 | No |
| Comparative Example 6 | 20 | 1.5 | 2 | 0 | 0 | 76.5 | 62 | 58 | No |
| Comparative Example 7 | 15 | 0 | 2 | 3 | 3 | 77 | 62 | 53 | No |
| Comparative Example 8 | 0 | 1.5 | 1.5 | 2 | 1.5 | 93.5 | 76 | 24 | No |

Comparative Examples 9-10

The adsorbents were prepared according to the same steps and conditions as those of Example 1, except that the nickel nitrate was replaced with an equal weight (calculated based on metal oxides) of iron nitrate and zinc nitrate, the measurement results of the specific surface area and other parameters were illustrated in Table 4.

Comparative Example 11

The adsorbent prepared according to the same steps and conditions as those of Example 1, except that lanthanum chloride and cerium chloride were replaced by an equal weight of nickel nitrate, the measurement results of the specific surface area and other parameters were illustrated in Table 4.

Comparative Example 12

The adsorbent prepared according to the same steps and conditions as those of Example 1, except that calcium oxide was replaced by an equivalent weight (calculated based on metal oxide) of sodium oxide, the measurement results of the specific surface area and other parameters were illustrated in Table 4.

Comparative Example 13

The adsorbent prepared according to the same steps and conditions as those of Example 1, except that the dried aluminum hydroxide gel was replaced with an equal weight of alkali silica sol, and the measurement of the specific surface area, etc. is shown in Table 4.

Reference to Example 14

The adsorbent was prepared according to the same steps and conditions as those of Example 1, except that the rare earth-modified molecular sieve was not prepared in advance, the adsorbent carrier was soaked with the same volume of a co-immersion liquid formed by cerium chloride, lanthanum chloride and nickel nitrate, the specific steps were as follows:

800 g of molecular sieve raw powder, 10 g of dried aluminum hydroxide gel and calcium oxide, 450 g of deionized water were mixed uniformly, 12 g of nitric acid was added as a binder, the materials were extruded on an extruder to obtain the strip-shaped materials having a size of φ 3-5 mm×10 mm, which were initially subjected to drying at 120° C. for 4 hours and then subjected to calcinating at 500° C. for 4 hours, in order to prepare the molecular sieve complex (or an adsorbent carrier).

78 g of nickel nitrate ($Ni(NO_3).6H_2O$), 76 g of cerium chloride and 30 g of lanthanum chloride were dissolved, the metered volume was performed according to the water absorption of the produced molecular sieve complex, so as to form a stable co-immersion liquid. The co-immersion liquid was taken and used for impregnating the adsorbent carrier at an equivalent-volume, the impregnation temperature was 25° C., and the impregnation time was 1 hour, the impregnated materials were subjected to drying at 120° C. for 6 hours and calcinating at 450° C. for 4 hours.

TABLE 4

| | Carriers | | | | | Adsorbents | | | | |
| --- | --- | --- | --- | --- | --- | --- | --- | --- | --- | --- |
| | Specific surface area, m²/g | Pore volume, ml/g | Percentage of the pore volume occupied by pores below 2 nm to the total pore volume, % | Percentage of the pore volume occupied by pores of 2-3 nm to the total pore volume, % | Percentage of the pore volume occupied by pores larger than 3 nm to the total pore volume, % | Specific surface area, m²/g | Pore volume, ml/g | Percentage of the pore volume occupied by pores below 2 nm to the total pore volume, % | Percentage of the pore volume occupied by pores of 2-3 nm to the total pore volume, % | Percentage of the pore volume occupied by pores larger than 3 nm to the total pore volume, % |
| Example 1 | 621 | 0.32 | 45.2 | 25.5 | 29.3 | 575 | 0.28 | 53.2 | 21.5 | 25.3 |
| Example 2 | 631 | 0.34 | 42.8 | 23.7 | 33.5 | 578 | 0.28 | 49.5 | 18.1 | 32.4 |
| Example 3 | 605 | 0.32 | 41.6 | 29.1 | 29.3 | 563 | 0.27 | 51.5 | 20.3 | 28.2 |
| Example 4 | 636 | 0.35 | 40.5 | 27.6 | 31.9 | 580 | 0.26 | 47.0 | 22.6 | 30.4 |
| Example 5 | 625 | 0.33 | 39.2 | 24.3 | 36.5 | 565 | 0.28 | 46.2 | 19.8 | 34 |
| Example 6 | 618 | 0.34 | 43.5 | 24.4 | 32.1 | 576 | 0.29 | 53.6 | 17.3 | 29.1 |
| Example 7 | 607 | 0.33 | 42.9 | 27.2 | 29.9 | 558 | 0.27 | 52.4 | 19.8 | 27.8 |
| Example 8 | 615 | 0.33 | 46.2 | 25.6 | 28.2 | 572 | 0.29 | 55.6 | 16.9 | 27.5 |
| Example 9 | 621 | 0.35 | 45.8 | 26.3 | 27.9 | 570 | 0.28 | 54.5 | 18.8 | 26.7 |
| Example 10 | 605 | 0.31 | 39.0 | 22.2 | 38.8 | 555 | 0.26 | 45.5 | 19.6 | 34.9 |
| Comparative Example 1 | 645 | 0.37 | 39.2 | 23.3 | 37.5 | 595 | 0.30 | 40.2 | 27.3 | 32.5 |
| Comparative Example 2 | 652 | 0.35 | 38.8 | 22.4 | 38.8 | 602 | 0.30 | 40.8 | 21.4 | 37.8 |
| Comparative Example 3 | 632 | 0.34 | 37.8 | 22.9 | 39.3 | 580 | 0.28 | 41.5 | 22.9 | 35.6 |
| Comparative Example 4 | 629 | 0.33 | 39.8 | 22.7 | 37.5 | 582 | 0.27 | 42.6 | 22.0 | 35.4 |
| Comparative Example 5 | 631 | 0.34 | 41.5 | 21.1 | 37.4 | 585 | 0.26 | 45.5 | 19.5 | 35.0 |
| Comparative Example 6 | 625 | 0.33 | 39.8 | 22.7 | 37.5 | 569 | 0.27 | 44.5 | 21.8 | 33.7 |
| Comparative Example 7 | 615 | 0.35 | 40.5 | 20.0 | 39.5 | 548 | 0.30 | 43.5 | 21.0 | 35.5 |
| Comparative Example 8 | 580 | 0.32 | 37.2 | 23.3 | 39.5 | 521 | 0.24 | 40.8 | 20.7 | 38.5 |
| Comparative Example 9 | 625 | 0.33 | 38.5 | 19.0 | 42.5 | 572 | 0.27 | 41.5 | 26.0 | 32.5 |
| Comparative Example 10 | 635 | 0.32 | 39.9 | 20.9 | 39.2 | 570 | 0.28 | 42.5 | 27.1 | 30.4 |
| Comparative Example 11 | 630 | 0.33 | 40.5 | 22.6 | 36.9 | 576 | 0.27 | 43.5 | 23.7 | 32.8 |
| Comparative Example 12 | 628 | 0.34 | 40.8 | 22.0 | 37.2 | 572 | 0.28 | 41.9 | 22.6 | 35.5 |
| Comparative Example 13 | 575 | 0.3 | 38.9 | 18.6 | 42.5 | 512 | 0.22 | 40.1 | 21.3 | 38.6 |
| Comparative Example 14 | 630 | 0.33 | 39.2 | 20.5 | 40.3 | 532 | 0.25 | 40.8 | 22.5 | 36.7 |

Test Example 1

The adsorption activity evaluation was performed on the adsorbents prepared in the Examples and the Comparative Examples:

The reaction vessel of the micro-reactor was made of stainless steel tubes with an inner diameter of 20 mm, the reaction vessel was placed in an incubator. The loading amount of the adsorbent was 10 ml, the upper part of the reaction vessel was filled with quartz sand having the same particle size as the adsorbent, the two substances were subjected to mixing and pre-heating. The contents of $SO_2$ in the inlet and outlet gases of the reaction vessel were analyzed by using a morphological sulfur chromatograph produced by the Agilent Technologies China Co., Ltd.

The operating conditions of chromatograph were as follows:
Chromatography column: Agilent 7890B
Detector: Antek 7090 (SCD)
Chromatography column: stainless steel column with a length of 30 m, an internal diameter of 0.32 mm, a liquid membrane thickness of 4 μm; and a liquid membrane specification PDMS-1

Column temperature: 250° C.
Detector temperature: 950° C.
Gasification chamber temperature: 275° C.
Flow rate of the carrier gas ($N_2$): 90 ml/min;
Injection quantity: 1 μL The composition of the inlet gas by volume was as follows: $CO_2$ 3 vol. %, $SO_2$ 0.03 vol. % (900 mg/m₃), $H_2O$ 3 vol. %, the balance was $N_2$, the gas volume hourly space velocity was 1,750 h$^{-1}$, and the reaction temperature was 120° C.

The removal rate η $SO_2$ of $SO_2$ for the sorbent was calculated according to the following formula:

$$\eta SO_2 = \frac{N_0 - N_1}{N_0} \times 100\%$$

Wherein $N_0$ and $N_1$ represented the volumetric concentration of $SO_2$ at the inlet and outlet, respectively.

The sulfur capacity was calculated according to the following formula:

$$Y = \frac{M_{sulfur}}{M_{catalyst}} \times 100\%$$

Wherein $M_{sulfur}$ represents the weight of sulfur adsorbed by activated carbon and $M_{catalyst}$ represents the weight of the adsorbent used for adsorbing sulfur; the saturated sulfur capacity refers to the maximum amount of sulfur that can be absorbed by an unit weight of the desulfurizing agent, that is, the fresh adsorbent was continuously contacted with the sulfur-containing gas, when the sulfur content of sulfur-containing gas before its contact with the adsorbent is equal to the sulfur content of sulfur-containing gas after its contact with the adsorbent, the percentage of the sulfur content adsorbed by the adsorbent relative to the adsorbent was exactly the saturated sulfur capacity.

Sulfur breakthrough capacity: referred to the weight percent of sulfur that can be adsorbed by the sorbent at certain conditions of use while ensuring the cleanness indicator of the process. In other words, when the sulfur content in the processed gas at an outlet is greater than the purification degree indicator of the process, the entire spent catalyst was immediately removed, the sulfur capacity measured by the samples on average was denoted as the sulfur breakthrough capacity. In the present disclosure, it was deemed to reach the sulfur breakthrough capacity when the $SO_2$ removal rate was reduced to 99%, that, the sulfur breakthrough capacity in the present disclosure referred to the sulfur capacity of the sorbent when the $SO_2$ removal rate was reduced to 99%, the total time of the sorbent in use before achieving the sulfur breakthrough capacity was defined as the time length of adsorption.

The analysis results were shown in Table 5.

TABLE 5

| | Adsorption time length, h | Saturated sulfur capacity, % | Sulfur breakthrough capacity, % |
|---|---|---|---|
| Example 1 | 95 | 14.5 | 10.9 |
| Example 2 | 88 | 13.5 | 10.6 |
| Example 3 | 92 | 14.2 | 10.8 |
| Example 4 | 90 | 14 | 10.7 |
| Example 5 | 88 | 13.1 | 10.5 |
| Example 6 | 91 | 13.8 | 10.7 |
| Example 7 | 93 | 13.5 | 10.7 |
| Example 8 | 95 | 14.2 | 10.8 |
| Example 9 | 92 | 13.7 | 10.7 |
| Example 10 | 70 | 11.1 | 10.0 |
| Comparative Example 1 | 58 | 9.2 | 7.5 |
| Comparative Example 2 | 62 | 9.5 | 7.8 |
| Comparative Example 3 | 55 | 9.8 | 7.3 |
| Comparative Example 4 | 75 | 11 | 8.8 |
| Comparative Example 5 | 80 | 11.5 | 9 |
| Comparative Example 6 | 52 | 9.9 | 7.1 |
| Comparative Example 7 | 68 | 10.2 | 8.3 |
| Comparative Example 8 | 66 | 9.5 | 7.5 |
| Comparative Example 9 | 55 | 9.5 | 7 |
| Comparative Example 10 | 50 | 9.2 | 7.2 |
| Comparative Example 11 | 45 | 8.3 | 6.5 |
| Comparative Example 12 | 60 | 10.2 | 8.1 |
| Comparative Example 13 | 66 | 10.3 | 8.1 |
| Comparative Example 14 | 64 | 8.8 | 6.5 |
| Molecular sieve raw powder used in Example 1 | 32 | 6 | 4.5 |

Test Example 2

The adsorbents prepared in Example 1 and Comparative Examples 1, 4 and 5 were subjected to $SO_2$ removal test (the specific method was the same as that in the Test example 1), when the adsorption of $SO_2$ by the adsorbent had a breakthrough and reached the sulfur breakthrough capacity of the adsorbent, the adsorption of $SO_2$-containing gas was stopped, the regeneration performance of the adsorbent was examined by switching to an introduction of nitrogen gas. The regeneration conditions were that the gas volume hourly space velocity was 1,200 $h^{-1}$, the temperature was 200° C., nitrogen gas was used as the purge gas, and the regeneration time was 6 h. The $SO_2$ removal test was carried out by using the regenerated adsorbent, and the adsorbent was subjected to regeneration when the sulfur breakthrough capacity was reached, the adsorbent was continuously regenerated for 5 times. The results of the sulfur breakthrough capacity of the adsorbent in regard to $SO_2$ following each time of regeneration were shown in Table 6.

TABLE 6

| | Sulfur breakthrough capacity, % | | | |
|---|---|---|---|---|
| Number of regenerations | Example 1 | Comparative Example 1 | Comparative Example 4 | Comparative Example 5 |
| 1 | 10.8 | 7.3 | 8.1 | 7.8 |
| 2 | 10.8 | 7 | 7.6 | 7.6 |
| 3 | 10.7 | 6.5 | 7.2 | 7.2 |
| 4 | 10.7 | 6 | 6.8 | 6.9 |
| 5 | 10.7 | 5.3 | 6.0 | 6.5 |

The data in Table 6 demonstrated that the sulfur breakthrough capacity of the adsorbent of the present disclosure remains substantially unchanged, and the composite material of the present disclosure exhibited excellent regeneration performance. The further experiments proved that the regeneration performance of the adsorbents obtained in Examples 2-7 was similar to that of Example 1 (the results were not shown).

Test Example 3

Desulfurization was performed by using the system of the present disclosure, as shown in FIG. 1, the system comprising:

an oxidation unit for treating the sulfur-containing gas and recovering the sulfur, comprising a liquid sulfur pool 17 and a thermal reaction furnace 11, a first stage condenser 12, a primary catalytic converter 13, a second stage condenser 14, a secondary catalytic converter 15 and a third stage condenser 16 which were connected in sequence; the liquid sulfur pool 17 was connected with the first stage condenser 12, the second stage condenser 14 and the third stage condenser 16 respectively, so as to collect the cooled liquid sulfur.

a hydrogenation purification unit, connected with the oxidation unit, for subjecting the oxidation tail gas discharged from the oxidation unit to hydrogenation reduction and recovering hydrogen sulfide in the reduced product obtained from the hydrogenation reduction; the hydrogenation purification unit comprising a hydrogenation reactor 21, a hydrogenation tail gas cooler 22, a quench tower 23 and an absorption tower 24 which were connected in sequence;

an incineration unit 31 for incinerating the purified tail gas discharged from the hydrogenation purification unit;

an adsorption unit for adsorbing $SO_2$ in the $SO_2$-containing flue gas obtained from incineration, the adsorbent used in the adsorption unit was the composite material prepared in the present disclosure, the adsorption unit comprising a first adsorption tower 41 and a second adsorption tower 42, which can be alternately used to achieve continuous adsorption;

a heat exchange unit including a tail gas reheater 111 and a flue gas heat exchanger 222, wherein the tail gas reheater 111 was disposed between the oxidation unit and the hydrogenation purification unit for heating the oxidized tail gas discharged from the oxidation unit, and the flue gas heat exchanger 222 was disposed between the incineration unit and the adsorption unit for lowering temperature of the flue gas generated by the incineration.

The steps of desulfurization were as follows (the specific operating conditions were shown in Table 7):

(a) Treatment of sulfur-containing gas and recovery of sulfur in an oxidation unit.

The acid gas containing 85 vol. % hydrogen sulfide (further containing $CO_2$ in an amount of 10 vol. %, hydrocarbon in an amount of 2 vol. %, $NH_3$ in an amount of 3 vol. %) in the thermal reaction unit was partially combusted in the thermal reaction furnace 11 to converting hydrogen sulfide into sulfur dioxide: the reaction was performed at a high temperature, the hydrogen sulfide and the sulfur dioxide performed the Claus reaction to produce elemental sulfur and process gas, the elemental sulfur was cooled by the first stage condenser 12 and delivered to the liquid sulfur pool 17 to produce the liquid sulfur;

The process gas passed sequentially through the primary catalytic converter 13, the second stage condenser 14, the secondary catalytic converter 15 and the third stage condenser 16 of the catalytic reaction unit. After subjecting to the Claus catalytic conversion, the elemental sulfur passed through the second stage condenser 14 and the third stage condenser 16 and entered the liquid sulfur pool 17; the reacted Claus tail gas was transported into the tail gas purification unit.

(b) The oxidized tail gas was subjected to hydrogenation reduction and the hydrogen sulfide in the reduction product obtained from the hydrogenation reduction was recovered in the hydrogenation purification unit.

The Claus tail gas was heated by a tail gas reheater 111 to 236° C. and entered the hydrogenation reactor 21, where the sulfur-containing compounds were subjected to hydrogenation and converted to hydrogen sulfide by the action of a hydrogenation catalyst in the hydrogenation reactor 21, the hydrogen sulfide was cooled by a hydrogenation tail gas cooler 22 and a quench tower 23, and entered an absorption tower 24 with an amine solution (high-efficiency desulfurizer with a model name KMKTS-15, purchased from the Zibo Kaimeike Trade Co., Ltd.), the hydrogen sulfide in the tail gas was absorbed to produce the purified tail gas.

(c) The tail gas after the hydrogenation reduction was incinerated in an incineration unit.

The purified tail gas was introduced into an incineration unit (incinerator) 31 for incineration, producing the $SO_2$-containing flue gas, which was introduced into an adsorption unit.

(d) Contacting the $SO_2$-containing flue gas obtained from the incineration with an adsorbent in an adsorption unit to adsorb $SO_2$ The flue gas was subjected to a heat exchange with a flue gas heat exchanger and its temperature was decreased to 145° C., the cooled flue gas entered a first absorption tower 41, which was in the adsorbed state. After the $SO_2$ in the flue gas was adsorbed, the flue gas was discharged via a chimney, and the $SO_2$ emission control target of the flue gas was 20 mg/m$^3$. In the initial stage of operation, $SO_2$ was not detected in the purified flue gas. After an operation for 650 h, the $SO_2$ was present in the flue gas at a low concentration of 1 mg/m$^3$. After continuous operation for 780 h, the concentration of $SO_2$ in the flue gas reached 8 mg/m$^3$. Following the continuous operation for 900 h, the concentration of $SO_2$ in the flue gas reached 20 mg/m$^3$. The first absorption tower 41 was switched off, and the second absorption tower 42 was switched on so as to adsorb the incineration tail gas. At the same time, the first absorption tower 41 was subjected to the thermal regeneration by introducing the hot nitrogen gas, the regeneration process produced a regenerative gas containing $SO_2$. The regenerative gas was introduced into the primary catalytic converter 13 and subjected to retreatment. The regeneration time was 100 h (relative to the sorbent with a volume of 20 m$^3$). When the concentration of $SO_2$ in the flue gas exhausted from the second absorption tower 42 reached 20 mg/m$^3$, the regenerated first absorption tower 41 was switched on so as to adsorb the regenerative gas. Finally, the $SO_2$ emission concentration in the sulfur recovery device can be controlled to be less than 20 mg/m$^3$ by controlling the adsorption accuracy of 20 mg/m$^3$, such that the requirements of reducing the concentration of $SO_2$ in the flue gas to less than 50 mg/m$^3$ imposed by the most stringent environmental protection regulations at present was satisfied. Furthermore, the regeneration mode was simple, and the whole treatment process was continuous and clean.

Test Example 4

The desulfurization of acid gas was performed according to the same system and method as those of the Test example 3, except that the incinerator of the incineration unit was replaced with the catalytic incineration reactor, and the regeneration mode was water wash regeneration, as shown in FIG. 2, the water wash regeneration mode was as follows: the washing water was introduced into the first adsorption tower 41 for carrying out the adsorbent regeneration, which brought forth the regenerated dilute acid, the regenerated dilute acid was introduced into the thermal reaction furnace 11 and subjected to retreatment. The regeneration time was 140 h. The specific operating conditions for each step were shown in Table 7.

TABLE 7

| | Operating conditions | Test example 3 | Test example 4 |
|---|---|---|---|
| Oxidation unit | Thermal reaction furnace | The temperature was 1,250° C. The residence time was 2 s | The temperature was 900° C. The residence time was 3 s |
| | First stage condenser The volume content of sulfur-containing compounds in the process gas at an outlet of the first stage condenser | The outlet temperature was 162° C. $H_2S$: 7.56%, $SO_2$: 3.78%, organic sulfur: 0.5% | The outlet temperature was 180° C. $H_2S$: 7.38%, $SO_2$: 3.61%, organic sulfur: 0.6% |

TABLE 7-continued

| | Operating conditions | Test example 3 | Test example 4 |
|---|---|---|---|
| | Primary catalytic converter | Catalyst: aluminium oxide-based catalyst (purchased from Shandong Qilu Keli Chemical Institute Co., Ltd., with a brand number LS-02) The gas volume hourly space velocity was 800 h$^{-1}$ The temperature was 306° C. | Catalyst: titania-based catalyst (purchased from Shandong Qilu Keli Chemical Institute Co., Ltd., with a brand number LS-981) The gas volume hourly space velocity was 600 h$^{-1}$ The temperature was 290° C. |
| | Second stage condenser | The outlet temperature was 153° C. | The outlet temperature was 130° C. |
| | Secondary catalytic converter | Catalyst: aluminium oxide-based catalyst (purchased from Shandong Qilu Keli Chemical Institute Co., Ltd., with a brand number LS-02) The gas volume hourly space velocity was 800 h$^{-1}$ The temperature was 246° C. | Catalyst: aluminium oxide-based catalyst (purchased from Shandong Qilu Keli Chemical Institute Co., Ltd., with a brand number LS-02) The gas volume hourly space velocity was 600 h$^{-1}$ The temperature was 220° C. |
| | Third stage condenser | The outlet temperature was 145° C. | The outlet temperature was 145° C. |
| | Volume content of the sulfur-containing compounds in the tail gas | $H_2S$: 1.28%, $SO_2$: 0.51%, organic sulfur: 0.05% | $H_2S$: 1.52%, $SO_2$: 0.75%, organic sulfur: 0.04% |
| Hydrogenation purification unit | Hydrogenation reactor | Catalyst: Co—Mo based tail gas hydrogenation catalyst (purchased from Shandong Qilu Keli Chemical Institute Co., Ltd., with a brand number LSH-02) The gas volume hourly space velocity was 500 h$^{-1}$ The temperature was 236° C. | Catalyst: Co—Mo based tail gas hydrogenation catalyst (purchased from Shandong Qilu Keli Chemical Institute Co., Ltd., with a brand number LS-951T) The gas volume hourly space velocity was 1,000 h$^{-1}$ The temperature was 350° C. |
| | Hydrogenation tail gas cooler | The outlet temperature was 145° C. | The outlet temperature was 155° C. |
| | Quench tower | The outlet temperature was 38° C. | The outlet temperature was 32° C. |
| | Absorption tower | Concentration of the amine solution was 38 wt. % The temperature was 38° C. | Concentration of the amine solution was 42 wt. % The temperature was 35° C. |
| | Volume content of the sulfur-containing compounds in the tail gas | $H_2S$: 82 ppm, COS: 16 ppm, no other sulfur-containing compound was detected | $H_2S$: 85 ppm, COS: 28 ppm, no other sulfur-containing compound was detected |
| Incineration unit | Incinerator | The temperature was 700° C., the residence time was 2.5 s | — |
| | Catalytic incineration reactor | — | Catalyst: a catalytic incineration catalyst containing iron and vanadium (purchased from Shandong Qilu Keli Chemical Institute Co., Ltd., with a brand number LS-941), the temperature was 300° C., the gas volume hourly space velocity was 800 h$^{-1}$ |
| | The $SO_2$ content in the generated flue gas | 256 mg/m$^3$ | 305 mg/m$^3$ |
| Adsorption unit | | Adsorbent: Example 1 The temperature was 150° C. The gas volume hourly space velocity was 2,000 h$^{-1}$ The concentration of $SO_2$ in flue gas reached 20 mg/m$^3$ when the operation time was 850 h | Adsorbent: Example 1 The temperature was 100° C. The gas volume hourly space velocity was 1,500 h$^{-1}$ The concentration of $SO_2$ in flue gas reached 20 mg/m$^3$ when the operation time was 780 h |
| Regeneration | Thermal regeneration | The gas volume hourly space velocity was 1,100 h$^{-1}$ The temperature was 230° C. | — |
| | Water wash regeneration | — | The liquid hourly space velocity (LHSV) was 1 h$^{-1}$, the temperature was 30° C. |

Test Example 5

The desulfurization of acid gas was performed with the same system and method as those of the Test example 3, except that the temperature of the adsorption unit was 180° C. and the gas volume hourly space velocity was 1,000 h-1. The concentration of $SO_2$ in the flue gas reached 20 mg/m$^3$ after an operation time of 700 h.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A molecular sieve complex, comprising an oxide of aluminum, an oxide of alkaline earth metal and a rare earth-modified molecular sieve, wherein the rare earth-modified molecular sieve is a molecular sieve doped by a rare earth element, wherein the percentage of the pore volume occupied by pores of 3 nm or less to the total pore volume in the molecular sieve complex is greater than or equal to 63.5%; and the molecular sieve complex satisfies formula I:

$$\frac{W4 + 0.9W1W2}{W1} \le W3 \le \frac{W1}{5W2} \qquad \text{formula I}$$

in formula I:
$W_1$ represents the weight content of total aluminum in the molecular sieve complex in terms of the oxide of aluminum;
$W_2$ represents the weight content of the oxide of alkaline earth metal in the molecular sieve complex;
$W_3$ represents the weight content of rare earth element in molecular sieve complex in terms of oxide; and
$W_4$ represents the weight content of molecular sieve in the molecular sieve complex in terms of $SiO_2$.

2. The molecular sieve complex of claim 1, wherein the percentage of the pore volume occupied by pores below 3 nm to the total pore volume in the molecular sieve complex is within a range of 63.5-72%;
and/or, the percentage of the pore volume occupied by pores below 2 nm to the total pore volume in the molecular sieve complex is within a range of 39-45.5%.

3. The molecular sieve complex of claim 1, wherein the percentage of the pore volume occupied by pores below 2 nm to the total pore volume in the molecular sieve complex is greater than or equal to 35%, the percentage of the pore volume occupied by pores of 2-3 nm to the total pore volume in the molecular sieve complex is within a range of 20-30%, the percentage of the pore volume occupied by pores larger than 3 nm to the total pore volume in the molecular sieve complex is within a range of 25-40%.

4. The molecular sieve complex of claim 1, wherein the oxide of aluminum is $Al_2O_3$, the oxide of alkaline earth metal is at least one of CaO, MgO and BaO, and the rare earth element is Ce and/or La;
and/or, the rare earth-modified molecular sieve is a rare earth-modified Y-type molecular sieve.

5. The molecular sieve complex of claim 1, wherein the rare earth element is a combination of Ce and La, and the weight ratio of Ce to La is 1-3;
and/or, the rare earth-modified molecular sieve is a rare earth-modified NaY molecular sieve.

6. The molecular sieve complex of claim 1, wherein the molecular sieve complex has a specific surface area greater than or equal to 550 m²/g and a pore volume greater than or equal to 0.25 ml/g;
and/or, a weight ratio between the oxide of aluminum, the oxide of alkaline earth metal, the rare earth element and the molecular sieve is (8-35):(0.5-3):(2.5-10):100;
and/or, the molecular sieve complex does not contain a detectable amount of Sc, Ti, V, Cr, Mn, Fe, Cu, Zn, W, Ru, Rh, Pd, Ag, Cd, Au, Y or Pt.

7. The molecular sieve complex of claim 1, wherein the molecular sieve complex has a specific surface area within a range of 550-600 m²/g and a pore volume within a range of 0.25-0.4 ml/g; and
a weight ratio between the oxide of aluminum, the oxide of alkaline earth metal, the rare earth element and the molecular sieve is (12-28):(0.6-2.1):(3.7-9.3):100.

8. A composite material, wherein the composite material comprises the molecular sieve complex of claim 1, and an auxiliary agent loaded on the molecular sieve complex.

9. The composite material of claim 8, wherein the auxiliary agent is at least one compound selected from an oxide of nickel, an oxide of cobalt and an oxide of molybdenum.

10. The composite material of claim 9, wherein the oxide of nickel is NiO, the oxide of cobalt is CoO, and the oxide of molybdenum is $MoO_3$.

11. The composite material of claim 8, wherein the percentage of the pore volume occupied by pores below 3 nm to the total pore volume in the composite material is within a range of 65-75%.

12. The composite material of claim 8, wherein the percentage of the pore volume occupied by pores below 2 nm to the total pore volume in the composite material is greater than or equal to 45%, the percentage of the pore volume occupied by pores of 2-3 nm to the total pore volume in the composite material is within a range of 15-35%, the percentage of the pore volume occupied by pores larger than 3 nm to the total pore volume in the composite material is within a range of 20-35%.

13. The composite material of claim 8, wherein the percentage of the pore volume occupied by pores below 2 nm to the total pore volume in the composite material is within a range of 45-55%.

14. The composite material of claim 8, wherein the composite material has an X-ray diffraction chromatogram substantially as shown in Table 1-a below:

TABLE 1-a

| 2θ(°) | d-spacing(Å) |
|---|---|
| 6.27-6.33 | 13.95-14.05 |
| 10.24-10.33 | 8.51-8.68 |
| 12.02-12.09 | 7.29-7.38 |
| 15.8-15.87 | 5.56-5.63 |
| 18.87-18.93 | 4.67-4.71 |
| 20.54-20.62 | 4.29-4.33 |
| 22.99-23.09 | 3.84-3.88 |
| 23.82-23.95 | 3.69-3.75 |
| 27.29-27.36 | 3.25-3.27 |
| 31.02-31.12 | 2.86-2.89 |
| 31.68-31.73 | 2.81-2.83 |

15. The composite material of claim 8, wherein the composite material has a specific surface area greater than or equal to 550 m²/g, a pore volume greater than or equal to 0.25 ml/g, a saturated sulfur volume greater than or equal to 12%, and a sulfur breakthrough capacity greater than or equal to 10%.

16. The composite material of claim 8, wherein the composite material has a specific surface area of 558-580 m²/g, a pore volume of 0.26-0.30 ml/g, a saturated sulfur volume of 12-15%, and a sulfur breakthrough capacity of 10-11%.

17. The composite material of claim 8, wherein a weight ratio between the oxide of aluminum, the oxide of alkaline earth metal, the rare earth element, the auxiliary agent and the molecular sieve is (8-35):(0.5-3):(2.5-10):(0.8-4):100.

18. The composite material of claim 8, wherein a weight ratio between the oxide of aluminum, the oxide of alkaline earth metal, the rare earth element, the auxiliary agent and the molecular sieve is (12-28):(0.6-2.1):(3.7-9.3):(1.2-3.3):100.

19. A method for desulfurization, wherein the method comprises the following steps:
a) oxidizing a sulfur-containing gas to be treated to obtain sulfur and a tail gas;
b) subjecting the tail gas to hydrogenation reduction and recovering hydrogen sulfide from a reduction product obtained from the hydrogenation reduction;
c) incinerating the reduced tail gas to obtain a $SO_2$-containing flue gas; and d) contacting the SO$_2$-containing flue gas with a sorbent to adsorb SO$_2$, wherein the sorbent is the composite material of claim 8.

20. The method of claim 19, wherein the contacting in step d) is carried out at a temperature within a range of 100-150° C. and a gas volume hourly space velocity within a range of 1,500-2,000 h$^{-1}$;

and/or, the method further comprises regenerating the sorbent, and returning the regenerated SO$_2$-containing regenerative gas to step a) for retreatment.

* * * * *